(12) United States Patent
Castledine et al.

(10) Patent No.: US 12,009,488 B2
(45) Date of Patent: Jun. 11, 2024

(54) REPLENISHED NEGATIVE ELECTRODES FOR SECONDARY BATTERIES

(71) Applicant: Enovix Corporation, Fremont, CA (US)

(72) Inventors: Christopher G. Castledine, Sunnyvale, CA (US); David T. Fouchard, Coquitlam (CA); Jonathan C. Doan, Pleasanton, CA (US); Christopher J. Spindt, Menlo Park, CA (US); Robert M. Spotnitz, Pleasanton, CA (US); James D. Wilcox, Pleasanton, CA (US); Ashok Lahiri, Cupertino, CA (US); Murali Ramasubramanian, Fremont, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 18/098,285

(22) Filed: Jan. 18, 2023

(65) Prior Publication Data

US 2023/0155189 A1 May 18, 2023

Related U.S. Application Data

(63) Continuation of application No. 16/998,203, filed on Aug. 20, 2020, now Pat. No. 11,569,533, which is a (Continued)

(51) Int. Cl.
*H01M 10/44* (2006.01)
*H01M 4/38* (2006.01)
(Continued)

(52) U.S. Cl.
CPC ......... *H01M 10/448* (2013.01); *H01M 4/386* (2013.01); *H01M 10/0525* (2013.01); *H01M 10/446* (2013.01); *H01M 10/48* (2013.01)

(58) Field of Classification Search
None
See application file for complete search history.

(56) References Cited

U.S. PATENT DOCUMENTS

| 6,335,115 B1 | 1/2002 | Meissner |
| 2008/0003490 A1 | 1/2008 | Christensen et al. |

(Continued)

FOREIGN PATENT DOCUMENTS

| CN | 101517792 A | 8/2009 |
| CN | 102084519 A | 6/2011 |

(Continued)

OTHER PUBLICATIONS

Patent Cooperation Treaty, International Search Report issued for PCT/US2016/031222, dated Jan. 13, 2017, 5 pages Jan. 13, 2017.

(Continued)

*Primary Examiner* — Jonathan G Leong
*Assistant Examiner* — Tony S Chuo
(74) *Attorney, Agent, or Firm* — HALEY GUILIANO LLP

(57) ABSTRACT

A method is provided for activating a secondary battery having a negative electrode, a positive electrode, and a microporous separator between the negative and positive electrodes permeated with carrier-ion containing electrolyte, the negative electrode having anodically active silicon or an alloy thereof. The method includes transferring carrier ions from the positive electrode to the negative electrode to at least partially charge the secondary battery, and transferring carrier ions from an auxiliary electrode to the positive electrode, to provide the secondary battery with a positive electrode end of discharge voltage $V_{pos,eod}$ and a negative electrode end of discharge so voltage $V_{neg,eod}$ when the cell is at a predefined $V_{cell,eod}$ value, the value of $V_{pos,eod}$ corresponding to a voltage at which the state of charge of the (Continued)

positive electrode is at least 95% of its coulombic capacity and $V_{neg,eod}$ is at least 0.4 V (vs Li) but less than 0.9 V (vs Li).

20 Claims, 14 Drawing Sheets

Related U.S. Application Data continuation of application No. 15/572,191, filed as application No. PCT/US2016/031222 on May 6, 2016, now Pat. No. 10,770,760.

(60) Provisional application No. 62/158,758, filed on May 8, 2015.

(51) Int. Cl.
  *H01M 10/0525* (2010.01)
  *H01M 10/48* (2006.01)

(56) References Cited

U.S. PATENT DOCUMENTS

| | | |
|---|---|---|
| 2009/0208834 A1 | 8/2009 | Ramasubramanian et al. |
| 2010/0015528 A1 | 1/2010 | Howard et al. |
| 2011/0081563 A1 | 4/2011 | Christensen et al. |
| 2011/0111294 A1 | 5/2011 | Lopez et al. |
| 2012/0045670 A1 | 2/2012 | Constantin et al. |
| 2012/0176093 A1 | 7/2012 | Ramasubramanian et al. |
| 2012/0251880 A1 | 10/2012 | Utsunomiya |
| 2013/0149560 A1 | 6/2013 | Viavattine et al. |
| 2015/0004444 A1 | 1/2015 | Christensen et al. |

FOREIGN PATENT DOCUMENTS

| | | |
|---|---|---|
| CN | 102738505 A | 10/2012 |
| JP | 2011054324 | 3/2011 |
| JP | 2013510405 | 3/2013 |
| JP | 2013-196820 A | 9/2013 |
| JP | 2014-120701 A | 6/2014 |
| KR | 10-2012-0128125 A | 11/2012 |
| KR | 10-2013-0025948 A | 3/2013 |
| TW | 201230465 A | 7/2012 |
| WO | 2011056847 | 5/2011 |
| WO | 2012/047596 A2 | 4/2012 |
| WO | 2014151202 | 9/2014 |

OTHER PUBLICATIONS

European Patent Office, Extended European Search Report for 16793258.1, publication 3295508, 6 pgs. Dec. 4, 2018.

REPLENISHED NEGATIVE ELECTRODES FOR SECONDARY BATTERIES

CROSS-REFERENCE TO RELATED APPLICATIONS

The present application claims priority as a continuation of Ser. No. 16/998,203, filed on Aug. 20, 2020, which is a continuation of Ser. No. 15/572,191, filed on Nov. 7, 2017, now U.S. Pat. No. 10,770,760, which claims priority as a 371 national phase application of PCT/US2016/031222, filed on May 6, 2016, which claims priority to provisional application 62/158,758 filed on May 8, 2015, each of which is hereby incorporated by reference in their entireties herein.

The present disclosure generally relates to methods for replenishing energy storage devices, and to replenished energy storage devices, such as secondary batteries.

In rocking chair battery cells, both the positive and negative electrodes comprise materials into which a carrier ion, such as lithium, inserts and extracts. As a cell is discharged, carrier ions are extracted from the negative electrode and inserted into the positive electrode. As a cell is charged, the reverse process occurs: the carrier ion is extracted from the positive and inserted into the negative electrode.

Silicon has become a promising candidate to replace carbonaceous materials as anode for rechargeable secondary batteries for its ultra-high capacity. Large volumetric increases upon carrier ion (e.g., lithium ion) insertion of over 300% have been observed for bulk silicon. This volumetric increase along with the cracking and pulverization associated with the charge and discharge cycles has limited the use of bulk silicon anodes in practice.

When an energy storage device such as a secondary battery is assembled, the amount of carrier ion available for cycling between the anode and the cathode is often initially provided in the cathode because cathode active materials, such as lithium cobalt oxide, are relatively stable in ambient air (e.g., against oxidation) compared to lithiated anode materials such as lithiated graphite. When a secondary battery is charged for the first time, carrier ion is extracted from the cathode and introduced into the anode. As a result, the anode potential is lowered significantly (toward the potential of metallic carrier ion), and the cathode potential is further increased (to become even more positive). These changes in potential may give rise to parasitic reactions on both electrodes, but sometimes more severely on the anode. For example, a decomposition product comprising lithium (or other carrier ions) and electrolyte components, known as solid electrolyte interphase (SEI), readily forms on the surfaces of carbon anodes. These surface layers or covering layers are carrier ion conductors which establish an ionic connection between the anode and the electrolyte and prevent the reactions from proceeding any further.

Although formation of the SEI layer is necessary for the stability of the half-cell system comprising the anode and the electrolyte, a portion of the carrier ion introduced into the cells via the cathode is irreversibly bound and thus removed from cyclic operation, i.e., from the capacity available to the user. As a result, during the initial discharge, less carrier ion is returned to the cathode from the anode than was initially provided by the cathode during the initial charging operation, leading to irreversible capacity loss. During each subsequent charge and discharge cycle, the capacity losses resulting from mechanical and/or electrical degradation to the anode and/or the cathode tend to be much less per cycle, but even the relatively small carrier ion losses per cycle contribute significantly to reductions in energy density and cycle life as the battery ages. In addition, chemical and electrochemical degradation may also occur on the electrodes and cause capacity losses.

Among the various aspects of the present disclosure is the provision of energy storage devices such as secondary batteries, fuel cells, and electrochemical capacitors in which capacity lost as a result of SEI formation and/or mechanical or electrical degradation of the negative electrode and/or the positive electrode may be restored. Advantageously, energy storage devices of the present disclosure offer increased cycle life, higher energy density, and/or increased discharge rate.

Briefly, therefore, one aspect of the present disclosure relates to a method for activating a secondary battery, the secondary battery having a negative electrode, a positive electrode, a microporous separator between the negative and positive electrodes permeated with a carrier ion-containing electrolyte in ionic contact with the negative and positive electrodes, and a control unit programmed with a predefined cell end of discharge voltage $V_{cell,eod}$ value, the negative electrode having anodically active silicon or an alloy thereof and having a coulombic capacity for the carrier ions, the positive electrode having a cathodically active material and having a coulombic capacity for the carrier ions, the negative electrode coulombic capacity exceeding the positive electrode coulombic capacity. The method includes (i) transferring carrier ions from the positive electrode to the negative electrode to at least partially charge the secondary battery wherein a solid electrolyte interphase is formed on a surface of the negative electrode during the transfer, and (ii) transferring carrier ions from an auxiliary electrode to the positive electrode, to provide the secondary battery with a positive electrode end of discharge voltage $V_{pos,eod}$ and a negative electrode end of discharge voltage $V_{neg,eod}$ when the cell is at the predefined $V_{cell,eod}$ value, wherein the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li).

Another aspect of the present disclosure is a method for activating a secondary battery having a negative electrode, a positive electrode, a microporous separator between the negative and positive electrodes permeated with a carrier ion-containing electrolyte in ionic contact with the negative and positive electrodes, and a control unit wherein the positive electrode comprises a cathodically active material and has a reversible coulombic capacity for the carrier ions, the negative electrode has anodically active silicon or an alloy thereof and has a reversible coulombic capacity for the carrier ions that exceeds the positive electrode coulombic capacity. The method includes (i) transferring carrier ions from the positive electrode to the negative electrode to at least partially charge the secondary battery wherein a solid electrolyte interphase is formed on a surface of the negative electrode during the transfer, (ii) after step (i), transferring carrier ions from an auxiliary electrode to the positive electrode, (iii) after step (ii), transferring carrier ions from the positive electrode to the negative electrode to charge the secondary battery, and (iv) programming the control unit to set a cell end of discharge voltage $V_{cell,eod}$, wherein the activated secondary battery has a positive electrode end of discharge voltage $V_{pos,eod}$ and a negative electrode end of discharge voltage $V_{neg,eod}$ when the cell is at $V_{cell,eod}$, the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li).

Another aspect of the present disclosure is a method for charging a secondary battery having a negative electrode, a positive electrode and a microporous separator between the negative and positive electrodes permeated with a carrier ion-containing electrolyte in ionic contact with the negative and positive electrodes, the negative electrode having anodically active silicon or an alloy thereof, the positive electrode having a cathodically active material, wherein a ratio of the coulombic capacity of the negative electrode to the coulombic capacity of the positive electrode is at least 1.2:1, respectively. The method includes (i) transferring carrier ions from an auxiliary electrode to the positive electrode, and (ii) charging the negative electrode with the carrier ions that were transferred from the auxiliary electrode to the positive electrode and thereby charging the secondary battery, the charged secondary battery having an end of discharge voltage $V_{cell,eod}$ and a negative electrode end of discharge voltage $V_{neg,eod}$, the $V_{neg,eod}$ being less than 0.9 V (vs Li) and at least 0.4 V (vs Li) when $V_{cell,eod}$ is reached.

Another aspect of the present disclosure is a secondary battery having a negative electrode, a positive electrode, a microporous separator between the negative and positive electrodes permeated with a carrier ion-containing electrolyte in ionic contact with the negative and positive electrodes, an auxiliary electrode, and a control unit. The positive electrode includes a cathodically active material and has a coulombic capacity for the carrier ions. The negative electrode includes anodically active silicon or an alloy thereof and has a coulombic capacity for the carrier ions that exceeds the positive electrode coulombic capacity. The control unit has a controller and a sensor electrically coupled to the sensor, the sensor being configured to measure a cell voltage of the secondary battery during operation of the secondary battery and to measure the voltage of the positive or negative electrode relative to the auxiliary electrode, the controller being programmed to end a charging operation of the secondary battery when a cell end of charge voltage $V_{cell,eoc}$ is detected and to end a discharging operation of the secondary battery when a cell end of discharge voltage $V_{cell,eod}$ is detected. Additionally, the positive electrode has an end of discharge voltage $V_{pos,eod}$ and the negative electrode has an end of discharge voltage $V_{neg,eod}$ when the cell is at $V_{cell,eod}$, the value of $V_{pos,eod}$ corresponding to a voltage at which the state of charge of the positive electrode is at least 95% of its coulombic capacity and $V_{neg,eod}$ is at least 0.4 V (vs Li) but less than 0.9 V (vs Li).

Other objects and features will be in part apparent and in part pointed out hereinafter.

BRIEF DESCRIPTION OF THE DRAWINGS

Corresponding reference characters indicate corresponding parts throughout the drawings.

Definitions

Figure 1:
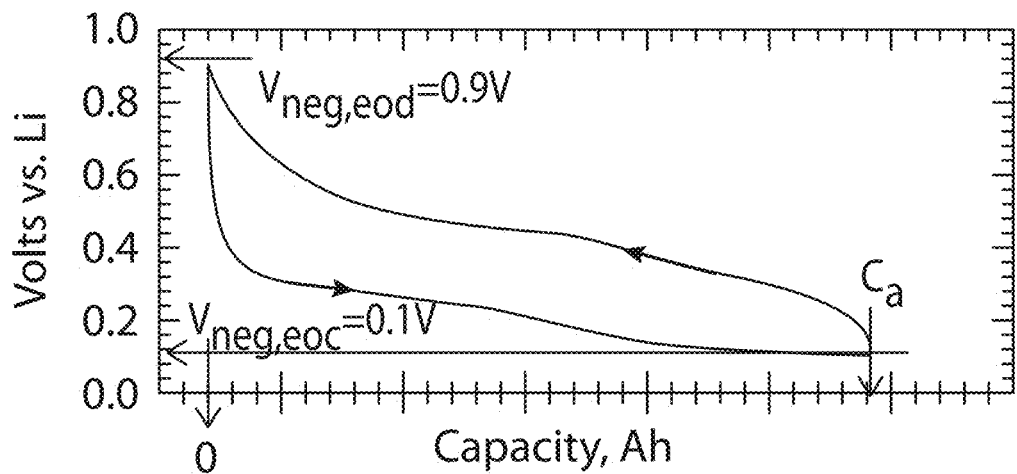
FIG. 1 is an exemplary charge/discharge cycle for a silicon-containing negative electrode.
Figure 2:
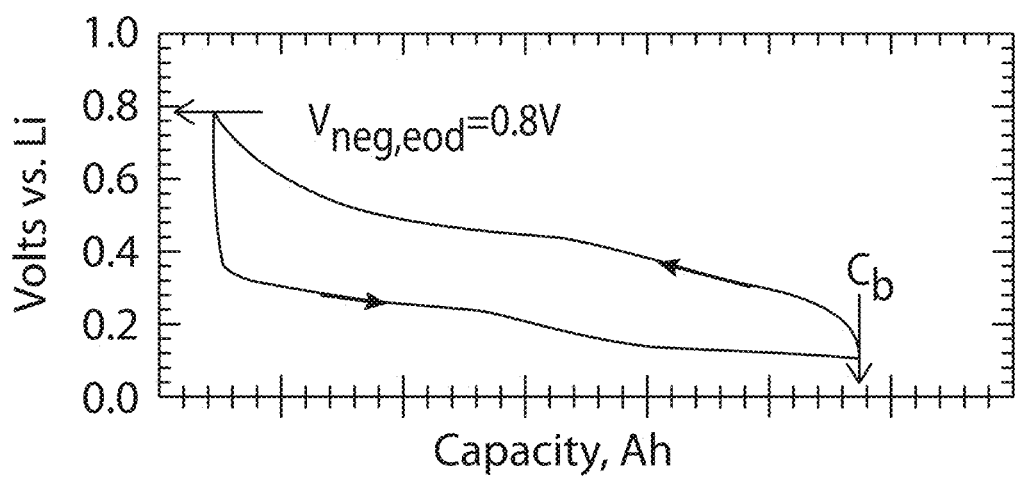
FIG. 2 is an exemplary charge/discharge cycle for a silicon-containing negative electrode.

"A," "an," and "the" (i.e., singular forms) as used herein refer to plural referents unless the context clearly dictates otherwise. For example, in one instance, reference to "an electrode" includes both a single electrode and a plurality of similar electrodes. The terms "comprising", "including" and "having" are intended to be inclusive and mean that there may be additional elements other than the listed elements.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

The term "discharge capacity" as used herein in connection with a negative electrode means the quantity of carrier ions available for extraction from the negative electrode and insertion into the positive electrode during a discharge operation of the battery between a predetermined set of cell end of charge and end of discharge voltage limits.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

"Rated capacity" as used herein in the context of a secondary battery refers to the capacity of the secondary battery to deliver current over a period of time, as measured under standard temperature conditions (25° C.). For example, the rated capacity may be measured in units of Amp hour, either by determining a current output for a specified time, or by determining for a specified current the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours.

The term "reversible coulombic capacity" as used herein in connection with an electrode (i.e., a positive electrode, a negative electrode or auxiliary electrode) means the total capacity of the electrode for carrier ions available for reversible exchange with a counter electrode.

DETAILED DESCRIPTION

Among the various aspects of the present disclosure may be noted a cell design and formation method for a secondary battery offering a range of advantages including, for example, improved cycle life, greater energy density, greater charge rate and/or greater discharge rate. In general, the secondary battery has a cell voltage limit for the charge/discharge cycle of the secondary battery, a positive electrode (cathode) and a negative electrode (anode), wherein the reversible coulombic capacity of the positive electrode is matched to the discharge capacity of the negative electrode after formation of the battery (i.e., after the initial charge/discharge cycle).

As previously noted, the formation of a solid electrolyte interphase (SEI) during the initial charge/discharge cycle reduces the amount of carrier ion available for reversible cycling. Mechanical and/or electrical degradation of the negative electrode during cycling of the battery may further reduce the amount of carrier ion available for reversible cycling. To compensate for the formation of SEI (or another carrier ion-consuming mechanism such as mechanical and/or electrical degradation of the negative electrode), therefore, additional or supplementary carrier ion may be provided from an auxiliary electrode after formation of the battery.

In general, the voltage limits of a secondary battery cell and the positive and negative electrodes of the secondary battery are related as follows:

$$V_{cell,eoc} = V_{pos,eoc} - V_{neg,eoc} \quad [1]$$

$$V_{cell,eod} = V_{pos,eod} - V_{neg,eod} \quad [2]$$

wherein $V_{cell,eoc}$ is the end of charge voltage for the cell, $V_{pos,eoc}$ is the end of charge voltage for the positive electrode, $V_{neg,eoc}$ is the end of charge voltage for the negative electrode, $V_{cell,eod}$ is the end of discharge voltage for the cell, $V_{pos,eod}$ is the end of discharge voltage for the positive electrode, and $V_{neg,eod}$ is the end of discharge voltage for the negative electrode.

In general, $V_{cell,eoc}$ is a maximum value in that the cell voltage is ideally always at or below this value, while $V_{cell,eod}$ is a minimum value in that the cell voltage is ideally always at or above this value. By design, the cell voltage limits, $V_{cell,eoc}$ and $V_{cell,eod}$ are fixed for the life of the battery, while the voltage limits of the individual electrodes can vary. As used herein, therefore, it should be understood that the specification of positive and negative electrode voltage limits at the end of charge or end of discharge refers to a charge or discharge cycle after formation of the battery, i.e., after the first charge and discharge cycle.

The end of charge voltage $V_{pos,eoc}$ for positive active materials used in secondary batteries may be as much as 5 V (vs. Li), typically in the range of about 4.3 V to 4.5 V (vs. Li), and the end of discharge voltage $V_{pos,eod}$ for positive active materials typically used in secondary batteries will typically be at least 2.5 V (vs. Li). For silicon-containing negative electrodes, the end of charge voltage $V_{neg,eoc}$ is typically 0.1 V (vs. Li) and the end of discharge voltage is a matter of design choice that is programmed into and controlled by a control unit of the battery. According to equations [1] and [2], therefore, the cell end-of-charge voltage $V_{cell,eoc}$ for a cell containing such materials is typically at least about 4.2 V, at least about 4.4 V (vs Li), or an even greater value, and the cell end of discharge voltage $V_{cell,eod}$ for such materials typically has a value of determined by the difference between 2.5 V and $V_{neg,eod}$ (vs. Li) (i.e., $V_{cell,eod} = 2.5\,V - V_{neg,eod}$).

In one embodiment of the present disclosure, the negative electrode end of discharge voltage $V_{neg,eod}$ is less than 0.9 V (vs. Li) and greater than 0.4 V (vs. Li) when the secondary battery reaches the cell end of discharge voltage $V_{cell,eod}$ during a discharge cycle of the secondary battery (after the initial charge and discharge cycle when SEI is formed). Thus, for example, in one such embodiment the negative electrode end of discharge voltage $V_{neg,eod}$ may be in the range of about 0.5 V (vs. Li) to about 0.8 V (vs. Li) when the secondary battery reaches the cell end of discharge voltage $V_{cell,eod}$ during a discharge cycle of the secondary battery (i.e., when the cell is under a discharge load). By way of further example, in one such embodiment the negative electrode end of discharge voltage $V_{neg,eod}$ may be in the range of about 0.6 V (vs. Li) to about 0.8 V (vs. Li) when the secondary battery reaches the cell end of discharge voltage $V_{cell,eod}$ during a discharge cycle of the secondary battery (i.e., when the cell is under a discharge load). In one such embodiment the negative electrode end of discharge voltage $V_{neg,eod}$ may be in the range of about 0.6 V (vs. Li) to about 0.7 V (vs. Li) when the secondary battery reaches the cell end of discharge voltage $V_{cell,eod}$ during a discharge cycle of the secondary battery (i.e., when the cell is under a discharge load).

Figure 4:
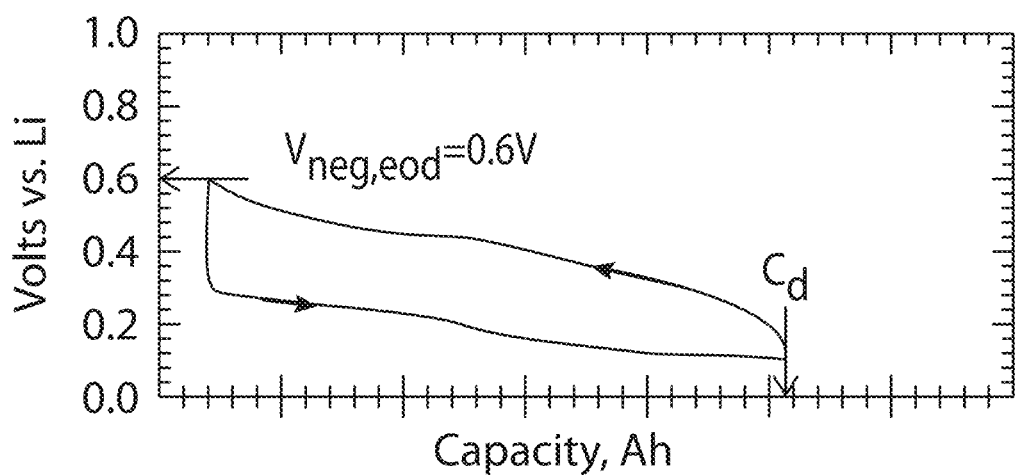
FIG. 4 is an exemplary charge/discharge cycle for a silicon-containing negative electrode.

FIGS. 1-4 illustrate exemplary charge/discharge cycles for a silicon-containing negative electrode. The silicon-containing negative electrode has an end of charge voltage $V_{neg,eoc}$ of 0.1 V (vs. Li) and an end of discharge voltage $V_{neg,eod}$ of 0.9 V (FIG. 1), 0.8 V (FIG. 2), 0.7 V (FIG. 3) or 0.6 V (FIG. 4) (vs. Li). The discharge capacity of the silicon-containing electrode having these end of charge and discharge limits is given by $C_a$ (FIG. 1), $C_b$ (FIG. 2), $C_c$ (FIG. 3) and $C_d$ (FIG. 4). Comparing the discharge capacities for the silicon-containing electrode illustrated in each of FIGS. 1-4, it can be observed that the discharge capacity of the electrode decreases as the value of the end of discharge voltage $V_{neg,eod}$ decreases (for a constant reversible coulombic capacity).

As illustrated by FIGS. 1-4, end of discharge voltage values less than 0.4V (vs. Li) reduce overall cell energy density and as such, are less preferred. Values of $V_{neg,eod}$ of at least 0.9 V (vs. Li) provide significantly greater overall cell energy density, but tend to reduce cycle life and are generally less preferred. In accordance with one aspect of the present disclosure, the end of discharge voltage, $V_{neg,eod}$, for a lithium ion battery comprising a silicon-containing electrode is less than 0.9 V (vs. Li). For example, in one such embodiment, $V_{neg,eod}$ does not exceed 0.8 V (vs. Li). By way of further example, in one such embodiment, $V_{neg,eod}$ does not exceed 0.7 V (vs. Li). By way of further example, in one such embodiment, $V_{neg,eod}$ does not exceed 0.6 V (vs. Li). By way of further example, in one such embodiment, $V_{neg,eod}$ does not exceed 0.5 V (vs. Li). In one such exemplary embodiment, $V_{neg,eod}$ exceeds 0.4 V but is less than 0.9 V (vs. Li). By way of further example, in one such embodiment $V_{neg,eod}$ is in the range of about 0.5 V to about 0.8 V (vs. Li). By way of further example, in one such embodiment $V_{neg,eod}$ is in the range of about 0.6 V to about 0.8 V (vs. Li). In one such exemplary embodiment, $V_{neg,eod}$ is in the range of about 0.6 V to about 0.7 V (vs. Li).

Figure 1A:
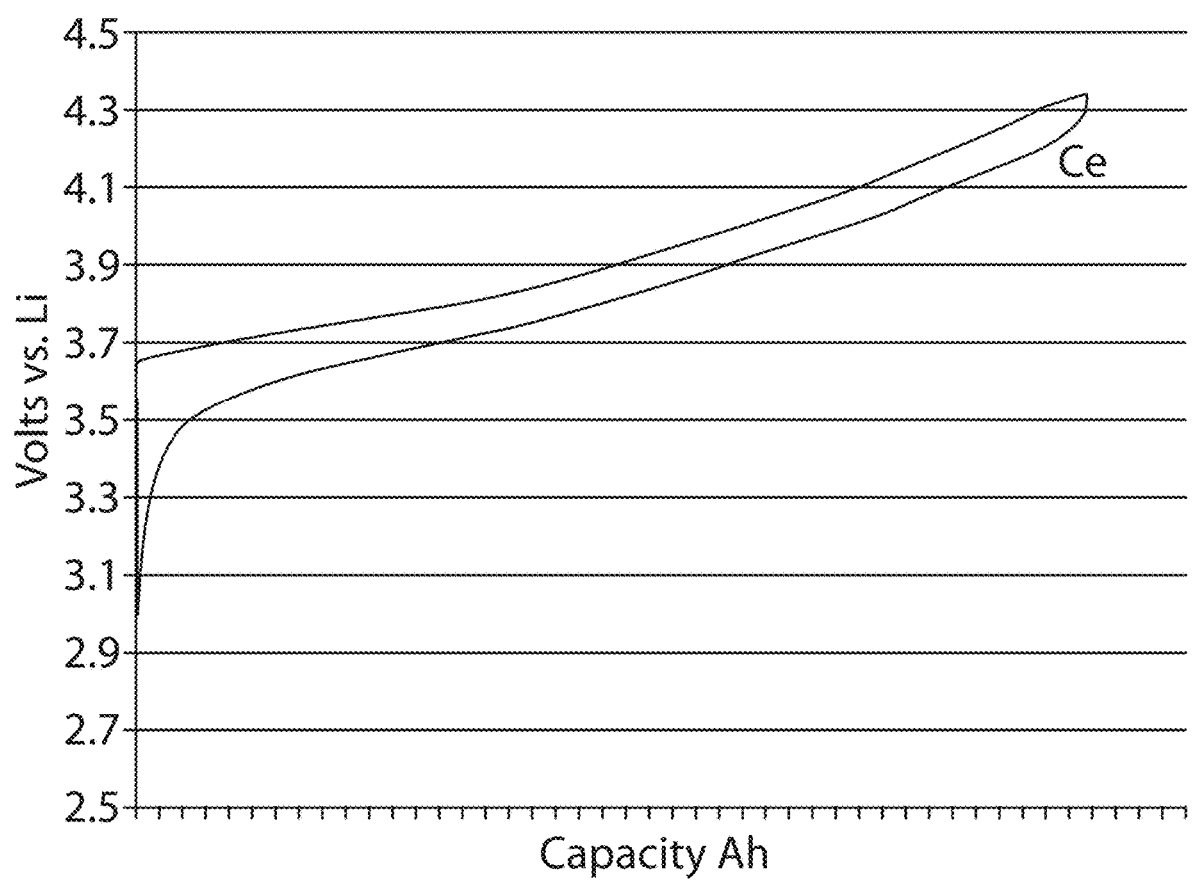
FIG. 1A is an exemplary charge/discharge cycle for a positive electrode matched to a silicon-containing electrode having the discharge capacity of the silicon-containing electrode of FIG. 1.
Figure 2A:
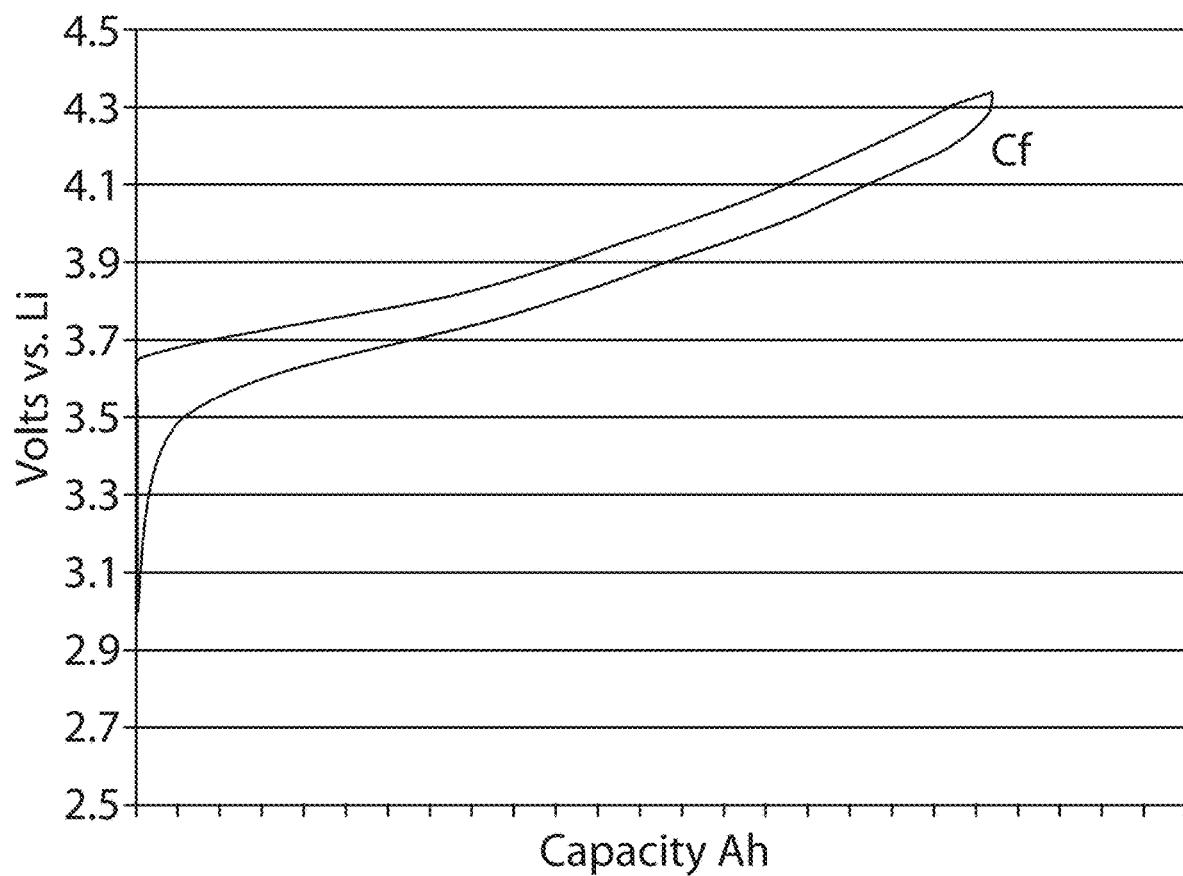
FIG. 2A is an exemplary charge/discharge cycle for a positive electrode matched to a silicon-containing electrode having the discharge capacity of the silicon-containing electrode of FIG. 2.
Figure 3:
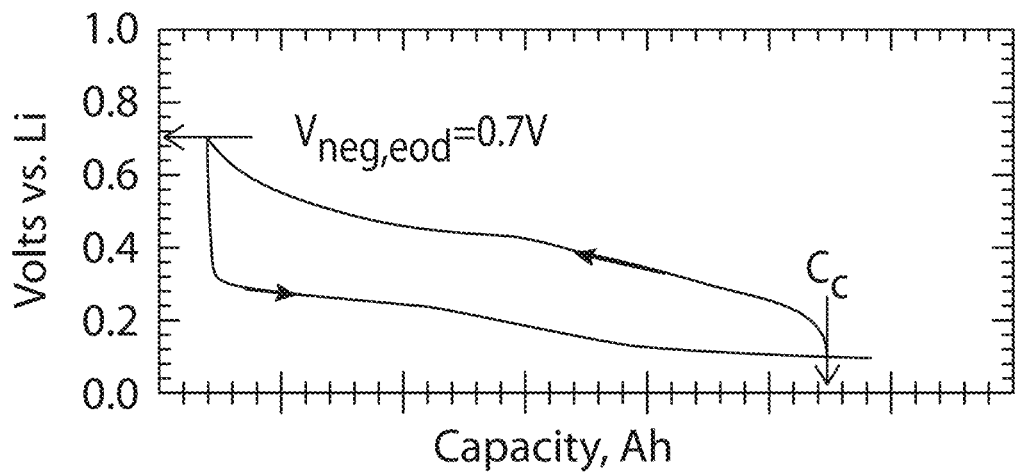
FIG. 3 is an exemplary charge/discharge cycle for a silicon-containing negative electrode.
Figure 3A:
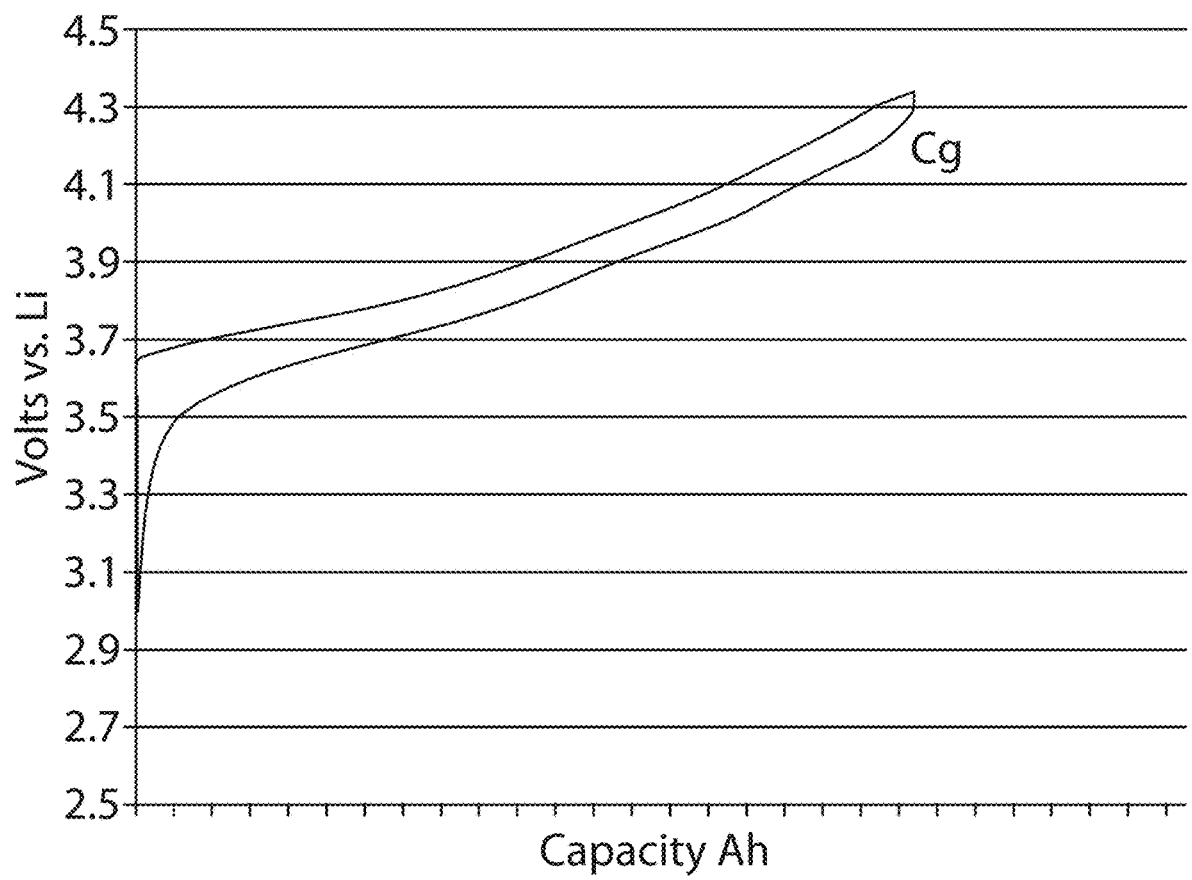
FIG. 3A is an exemplary charge/discharge cycle for a positive electrode matched to a silicon-containing electrode having the discharge capacity of the silicon-containing electrode of FIG. 3.
Figure 4A:
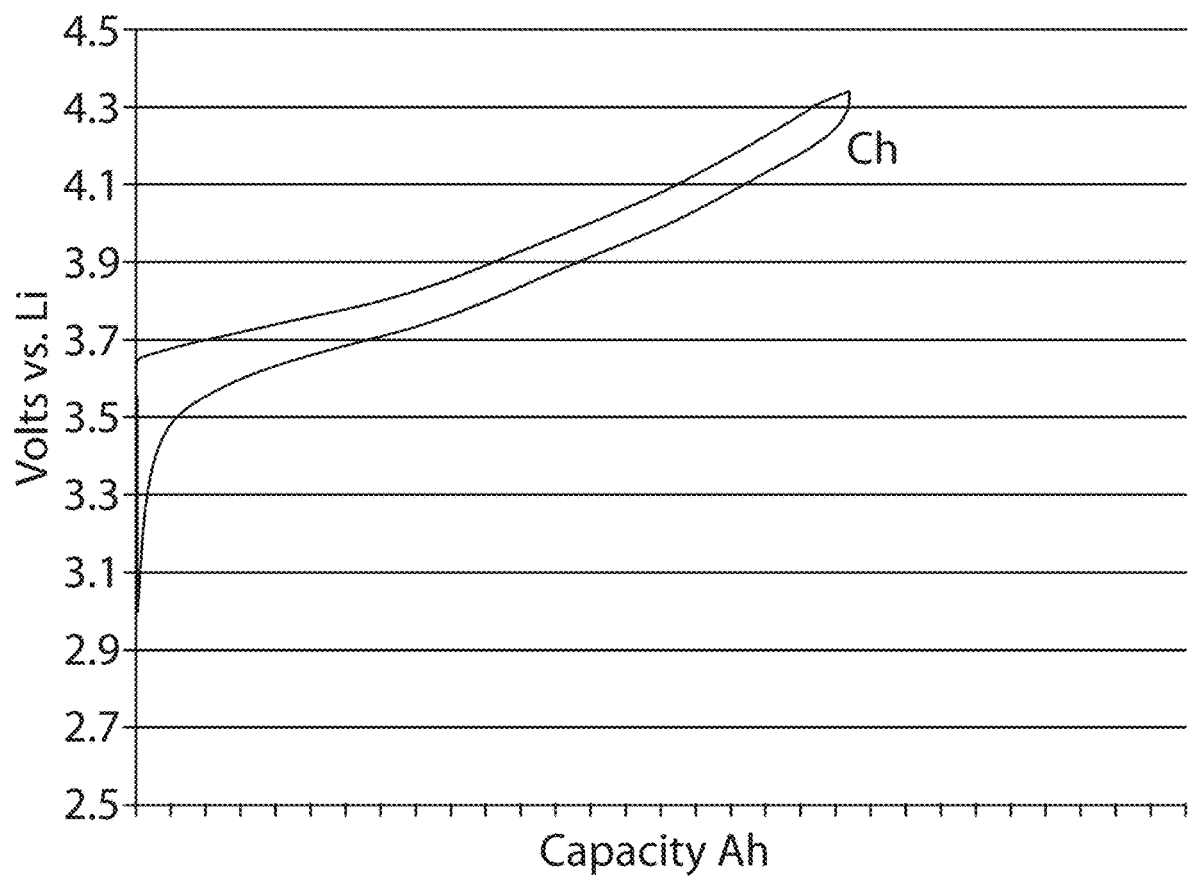
FIG. 4A is an exemplary charge/discharge cycle for a positive electrode matched to a silicon-containing electrode having the discharge capacity of the silicon-containing electrode of FIG. 4.

In general, a positive electrode of a secondary battery of the present disclosure preferably has a reversible coulombic capacity that is matched to the discharge capacity of the negative electrode. Stated differently, the cathode is sized to have a reversible coulombic capacity that corresponds to the discharge capacity of the negative electrode which, in turn, is a function of the negative electrode end of discharge voltage $V_{neg,eod}$ (see FIGS. 1-4). For example, and referring now to FIGS. 1A-4A, the reversible coulombic capacity of a positive electrode sized to match the discharge capacity of a negative electrode having the end of discharge voltage limits of FIGS. 1-4, will be given by $C_e$ (FIG. 1A), $C_f$ (FIG. 2A), $C_g$ (FIG. 3A) and $C_h$ (FIG. 4A), respectively. Comparing FIGS. 1A-4A, it can be observed that the reversible coulombic capacity of a positive electrode that is matched to the discharge capacity of a negative electrode decreases as the value of the end of discharge voltage $V_{neg,eod}$ decreases for the negative electrode (having a constant reversible coulombic capacity).

In one embodiment, the reversible capacity of the positive electrode is matched to the discharge capacity of the negative electrode such that, when $V_{cell,eod}$ is reached, the positive electrode has a $V_{pos,eod}$ value that corresponds to a voltage at which the state of charge of the positive electrode is at least 95% of its reversible coulombic capacity and $V_{neg,eod}$ is at least 0.4 V (vs Li) but less than 0.9 V (vs. Li). For example, in one such embodiment, when $V_{cell,eod}$ is reached, the positive electrode has a $V_{pos,eod}$ value that corresponds to a voltage at which the state of charge of the positive electrode is at least 96% of its reversible coulombic capacity and $V_{neg,eod}$ is at least 0.4 V (vs Li) but less than 0.9 V (vs. Li). By way of further example, in one such embodiment when $V_{cell,eod}$ is reached, the positive electrode has a $V_{pos,eod}$ value that corresponds to a voltage at which the state of charge of the positive electrode is at least 97% of its reversible coulombic capacity and $V_{neg,eod}$ is at least 0.4 V (vs Li) but less than 0.9 V (vs. Li). By way of further example, in one such embodiment when $V_{cell,eod}$ is reached, the positive electrode has a $V_{pos,eod}$ value that corresponds to a voltage at which the state of charge of the positive electrode is at least 98% of its reversible coulombic capacity and $V_{neg,eod}$ is at least 0.4 V (vs Li) but less than 0.9 V (vs Li). By way of further example, in one such embodiment when $V_{cell,eod}$ is reached, the positive electrode has a $V_{pos,eod}$ value that corresponds to a voltage at which the state of charge of the positive electrode is at least 99% of its reversible coulombic capacity and $V_{neg,eod}$ is at least 0.4 V (vs Li) but less than 0.9 V (vs. Li).

In accordance with one aspect of the present disclosure, the negative electrode is designed to have a reversible coulombic capacity that significantly exceeds the reversible coulombic capacity of the positive electrode. For example, in one embodiment a ratio of the reversible coulombic capacity of the negative electrode to the reversible coulombic capacity of the positive electrode is at least 1.2:1, respectively. By way of further example, in one embodiment a ratio of the reversible coulombic capacity of the negative electrode to the reversible coulombic capacity of the positive electrode is at least 1.3:1, respectively. By way of further example, in one embodiment a ratio of the reversible coulombic capacity of the negative electrode to the reversible coulombic capacity of the positive electrode is at least 2:1, respectively. By way of further example, in one embodiment a ratio of the reversible coulombic capacity of the negative electrode to the reversible coulombic capacity of the positive electrode is at least 3:1, respectively. By way of further example, a ratio of the reversible coulombic capacity of the negative electrode to the reversible coulombic capacity of the positive electrode is at least 4:1, respectively. By way of further example, a ratio of the reversible coulombic capacity of the negative electrode to the reversible coulombic capacity of the positive electrode is at least 5:1, respectively. Advantageously, the excess coulombic capacity of the negative electrode provides a source of anodically active material to allow the battery to reversibly operate within a specified voltage that inhibits formation of crystalline phases (incorporating carrier ion) on the negative electrode that reduce cycle-life the negative electrode (and hence the battery) as result of battery cycling. Additionally, excess anodic coulombic capacity and depressing the negative electrode voltage upon discharge provides a battery with a greater energy density (as a result of a greater average voltage).

In general, the carrier ion may be any carrier ion suitable for use in a secondary battery. In one preferred exemplary embodiment, the secondary battery utilizes carrier ions selected, for example, from lithium, sodium, potassium, calcium, magnesium and aluminum ions that cycle between members of the electrode and counter-electrode populations as the secondary battery is charged and discharged. For example, in one such embodiment the carrier ions are lithium ions. By way of further example, in another such embodiment the carrier ions may be magnesium ions. By way of further example, in another such embodiment the carrier ions may be aluminum ions.

Figure 5:
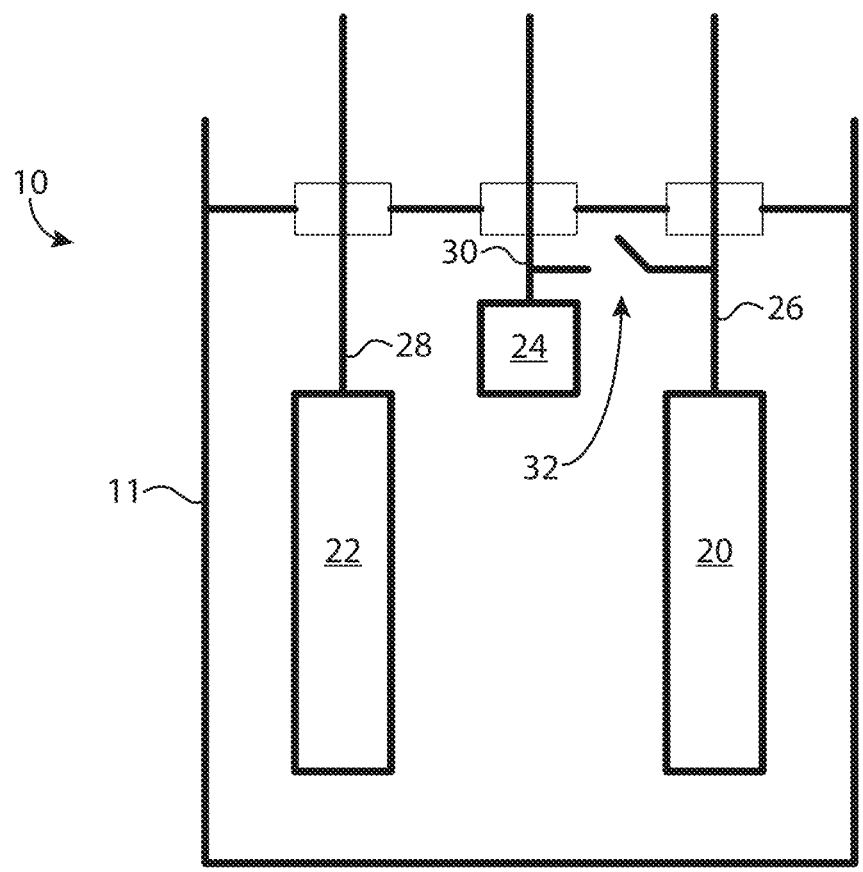
FIG. 5 is a schematic diagram of one embodiment of a secondary battery of the present disclosure.

Referring now to FIG. 5, one embodiment of a secondary battery of the present disclosure, generally designated 10 is illustrated. The battery 10 includes within battery enclosure 11 at least one positive electrode structure 20, at least one negative electrode structure 22, an auxiliary electrode 24 that may be selectively electrically connected or coupled to the positive electrode structure 20 (e.g., by a switch 32), and a control unit (not shown). The auxiliary electrode 24, while being shown in the headspace of the battery 10, may be provided in other locations as may be desired. Tabs 26, 28, 30 enable the positive electrode, negative electrode and auxiliary electrode to be connected to battery terminals (not shown) outside for connection to an energy source or consumer and switch 32 enables electrical connection between positive electrode structure 20 and auxiliary electrode 24. The control unit comprises a sensor for sensing the cell voltage (i.e., the voltage between the positive and negative electrodes) and for sensing the voltage of the positive electrode, the negative electrode or both the positive and negative electrode relative to the auxiliary electrode. The control unit further comprises a controller for controlling the charge and discharge cycles of the battery in response to the voltage sensed by the sensor.

The battery enclosure 11 may be constructed of any of a range of materials conventionally employed for secondary batteries. For example, in one embodiment, the battery enclosure 11 may be made of a plastic material or a plastic-foil laminate material (e.g., an aluminum foil provided intermediate a polyolefin layer and a polyester layer). Alternatively, the battery enclosure 11 may be made of stainless steel, titanium, aluminum or another metal or an alloy thereof.

In one embodiment, positive electrode structure 20 comprises any of a range of cathodically active material capable of storing lithium or other carrier ions. For example, positive electrode may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathodically active materials include $LiCoO_2$, $LiNi_{0.5}Mn_{1.5}O_4$, $Li(Ni_x Co_y Al_z)O_2$, $LiFePO_4$, $Li_2MnO_4$, $V_2O_5$, molybdenum oxysulfides, phosphates, silicates and vanadates and combinations thereof. The cathodically active material may be deposited to form the positive electrode structure by any of a range of techniques including, for example, electrophoretic deposition, electrodeposition, co-deposition or slurry deposition. In one exemplary embodiment, one of the aforementioned cathodically active materials, or a combination thereof, in particulate form is electrophoretically deposited. In another exemplary embodiment, a cathodically active material such as $V_2O_5$ is electrodeposited. In another exemplary embodiment, one of the aforementioned cathodically active materials, or a combination thereof, in particulate form is co-deposited in a conductive matrix such as polyaniline. In another exemplary embodiment, one of the aforementioned cathodically active materials, or a combination thereof, in particulate form is slurry deposited.

Negative electrode structure 22 comprises a silicon-containing anodically active material. In one embodiment, negative electrode structure 22 comprises silicon, a silicon alloy, a mixture of silicon and an another anodically active material, a mixture of silicon and an electrochemically inert material, or a combination thereof. For example in one exemplary embodiment, negative electrode structure 22 comprises silicon or a combination of silicon and carbon, germanium; selenium; nickel copper, tin, manganese, bismuth, silver, gold, zinc, lead and/or lead. By way of further example, in one such exemplary embodiment, negative electrode structure 22 comprises silicon; silicon and germanium; silicon and carbon; silicon and selenium; silicon, selenium, and carbon; a mixture of silicon and nickel and/or copper, or combinations thereof. In one exemplary embodiment, negative electrode structure 22 comprises silicon or an oxide or nitride thereof, a fluoride thereof, or other alloy thereof. In another exemplary embodiment, negative electrode structure 22 comprises silicon or an alloy thereof. In each of the embodiments and examples recited in this paragraph, negative electrode structure 22 may be a particulate agglomerate electrode or a monolithic electrode. Negative electrode structure 22 may be formed or otherwise assembled using methods such as electrodeposition, electrophoretic deposition, vapor deposition, catalyst based growth such as Vapor-Liquid-Solid deposition, gel-casting, tape casting, patterning and slurry deposition followed by densification by methods such as sintering, binding.

In one embodiment, negative electrode structure 22 comprises a microstructured silicon-containing active material that contains a significant void volume fraction to accommodate volume expansion and contraction as carrier ions are incorporated into or leave the negative electrode structure 22 during charging and discharging cycles. In general, the void volume fraction of the anodically active material is at least 0.1. Typically, however, the void volume fraction of the anodically active material is not greater than 0.8. For example, in one embodiment, the void volume fraction of the anodically active material is about 0.15 to about 0.75. By way of the further example, in one embodiment, the void volume fraction of the anodically active material is about 0.2 to about 0.7. By way of the further example, in one embodiment, the void volume fraction of the anodically active material is about 0.25 to about 0.6.

Depending upon the composition of the microstructured anodically active material and the method of its formation, the microstructured anodically active material may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the anodically active material contains voids having openings at the lateral surface of the anodically active material (that is, the surface facing the separator and the cathodically active material) through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interphase ("SEI") while each provides room for expansion of the anodically active material upon the entry of carrier ions. In certain embodiments, therefore, it is preferred that the anodically active material comprise a combination of open and closed voids.

In one embodiment, negative electrode structure 22 comprises porous silicon or an alloy thereof. Porous silicon layers may be formed, for example, by anodization, by etching (e.g., by depositing precious metals such as gold, platinum, silver or gold/palladium on the (100) surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1 but less than 0.8 as previously noted.

In another embodiment, negative electrode structure 22 comprises fibers of silicon or an alloy thereof. Individual fibers may have a diameter (thickness dimension) of about 5 nm to about 10,000 nm. Fibers (nanowires) of silicon may be formed, for example, by chemical vapor deposition or other techniques known in the art such as vapor liquid solid (VLS) growth and solid liquid solid (SLS) growth. Additionally, the anodically active material 22 will generally have a porosity fraction of at least about 0.1 but less than 0.8 as previously described.

In one embodiment, the positive and negative electrodes are sized such that after formation, when cycled against a reference electrode, the reversible coulombic capacity of the negative electrode is at least 120% of the reversible coulombic capacity of the positive electrode. For example, in one such embodiment, the positive and negative electrodes are sized such that after formation when cycled against a reference electrode, the reversible coulombic capacity of the negative electrode is at least 130% of the reversible coulombic capacity of the positive electrode. By way of further example, in one such embodiment, the positive and negative electrodes are sized such that after formation when cycled against a reference electrode, the reversible coulombic capacity of the negative electrode is at least 200% of the reversible coulombic capacity of the positive electrode. By way of further example, in one such embodiment, the positive and negative electrodes are sized such that after formation when cycled against a reference electrode, the reversible coulombic capacity of the negative electrode is at least 300% of the reversible coulombic capacity of the positive electrode. By way of further example, in one such embodiment, the positive and negative electrodes are sized such that after formation when cycled against a reference electrode, the reversible coulombic capacity of the negative electrode is at least 400% of the reversible coulombic capacity of the positive electrode. By way of further example, in one such embodiment, the positive and negative electrodes are sized such that after formation when cycled against a reference electrode, the reversible coulombic capacity of the negative electrode is at least 500% of the reversible coulombic capacity of the positive electrode. By way of further example, in one such embodiment, the positive and negative electrodes are sized such that after formation when cycled against a reference electrode, the reversible coulombic capacity of the negative electrode is about 120% to about 175% of the reversible coulombic capacity of the positive electrode, or even about 120% to about 150% of the reversible coulombic capacity of the positive electrode.

The positive and negative electrode structures 20, 22 may be provided as flat or planar components of the battery 10, may be wound in a spiral or other configuration, may be provided in a folded configuration; for example, the electrodes may be wrapped around a relatively rectangular mandrel such that they form an oval wound coil for insertion into a relatively prismatic battery cases.

The auxiliary electrode contains a source of carrier ions to replenish the lost energy capacity after formation of the battery (i.e., to compensate for the loss of carrier ions upon the formation of SEI and other carrier ion losses in the first charge and/or discharge cycle). The auxiliary electrode may comprise a foil of the carrier ion in metallic form (e.g., a foil of lithium, magnesium or aluminum), or any of the previously mentioned positive or anodically active materials in their carrier-ion containing form. For example, the auxiliary electrode may comprise lithiated silicon or a lithiated silicon alloy. The auxiliary electrode may be formed by placing an electrode made from the desired material in an inactive area of the battery cell but still electrolytically coupled to the negative electrode and/or the positive electrode through separator. Alternatively, the auxiliary electrode can be formed by depositing the desired auxiliary electrode material, using techniques such as electrochemical deposition, electroless deposition, electrophoretic deposition, vacuum assisted filling, stencil assisted filling, dip coating and the like.

In one embodiment, the auxiliary electrode is sized so as to be capable of providing at least 15% of the reversible coulombic capacity of the positive electrode. For example, in one such embodiment, the auxiliary electrode is sized such that it contains sufficient carrier ion (e.g., lithium, magnesium or aluminum ions) to provide at least 30% of the reversible coulombic capacity of the positive electrode. By way of further example, in one such embodiment, the auxiliary electrode is sized such that it contains sufficient carrier ion to provide at least 100% of the reversible coulombic capacity of the positive electrode. By way of further example, in one such embodiment, the auxiliary electrode is sized such that it contains sufficient carrier ion to provide at least 200% of the reversible coulombic capacity of the positive electrode. By way of further example, in one such embodiment, the auxiliary electrode is sized such that it contains sufficient carrier ion to provide at least 300% of the reversible coulombic capacity of the positive electrode. By way of further example, in one such embodiment, the auxiliary electrode is sized such that it contains sufficient carrier ion to provide about 100% to about 200% of the reversible coulombic capacity of the positive electrode.

Once the cell is assembled, the cell is charged by transferring carrier ions from the positive to the negative electrode. Charging is discontinued when the positive electrode reaches the design value of $V_{pos,eoc}$. During the initial charging cycle, SEI readily forms on the surfaces of negative electrode structures. To compensate for the loss of carrier ions to SEI, and referring again to FIG. 5, the positive electrode structure 20 may be replenished by closing switch 32 and applying a voltage across auxiliary electrode 24 and positive electrode structure 20 to drive carrier ions from the auxiliary electrode to the positive electrode. Once the transfer of carrier ions from the auxiliary electrode to the positive electrode is complete, the negative electrode is again charged, this time with carrier ions transferred from the auxiliary electrode until the $V_{cell,eoc}$ value is reached, which typically corresponds to a $V_{neg,eoc}$ value of about 0.1 V and a $V_{pos,eoc}$ value that is equal to the sum of Veen and 0.1 V (vs Li).

In yet another embodiment, the positive electrode may be replenished with carrier ions by simultaneously transferring carrier ions from the auxiliary electrode to the positive electrode, while also transferring carrier ions from the positive electrode to the negative electrode. Referring to FIG. 5, a voltage is applied across the positive electrode structure 20 and negative electrode structure 22, to drive carrier ions from the positive electrode structure 20 to the negative electrode structure 22. While the carrier ions are being transferred from the positive electrode structure 20 to the negative electrode structure 22, the switch 32 may be closed and a voltage applied across the auxiliary electrode 24 and the positive electrode structure 20 to drive carrier ions from the auxiliary electrode 24 to the positive electrode structure 20. Thus, carrier ions are transferred from the auxiliary electrode 24 to the positive electrode structure 20 at the same time that carrier ions are being transferred from the positive electrode structure 20 to the negative electrode. That is, a voltage is maintained across the positive electrode structure 20 and negative electrode structure 22 that is sufficient to drive carrier ions from the positive electrode structure 20 to the negative electrode structure 22, at the same time that a voltage is maintained across the auxiliary electrode 24 and positive electrode structure 20 that is sufficient to drive carrier ions from the auxiliary electrode to the positive electrode structure. In one embodiment, the switch 32 may be closed and the voltage applied across the auxiliary electrode 24 and positive electrode structure 20 to drive carrier ions to the positive electrode structure 20 at a time $t_1$ that is a predetermined duration after onset at to of a voltage being applied across the positive electrode structure 20 and negative electrode structure 22 to drive carrier ions to the negative electrode structures. That is, onset of the transfer of carrier ions from the positive electrode structure 20 to the negative electrode structure 22 may begin at an initial time to, with onset of the transfer of carrier ions from the auxiliary electrode 24 to the positive electrode structure 20 commencing at time $t_1$ that is a predetermined time after to, such that for times after $t_1$ the carrier ions are transferred from the auxiliary electrode 24 to the positive electrode structure 20 simultaneously with transfer of carrier ions from the positive electrode structure to the negative electrode structure 22. In another embodiment, the onset of transfer of carrier ions from the auxiliary electrode 24 to the positive electrode structure 20 may commence simultaneously with onset of the transfer of carrier ions from the positive electrode structure 20 to the negative electrode structure 22, such as at time $t_0$. Similarly, in one embodiment, the transfer of carrier ions from the auxiliary electrode 24 to the positive electrode structure 20 may be halted at a time $t_2$ that is the same as a time when transfer of carrier ions from the positive electrode structure 20 to the negative electrode structure 22 is halted, and/or the transfer of carrier ions from the auxiliary electrode 24 may be halted at a time $t_2$ that is a predetermined time before a time $t_3$ when the transfer of carrier ions from the positive electrode structure 20 to the negative electrode structure 22 is halted.

In one embodiment, the rate of transfer of carrier ions from the positive electrode structure 20 to the negative electrode structure 22 is greater than or equal to the rate of transfer of carrier ions from the auxiliary electrode 24 to the positive electrode structure 20, such that a good overall rate of transfer of carrier ions from the auxiliary electrode 24 to the negative electrode structure 22 via the positive electrode structure 20 can be maintained. That is, the relative rates of transfer between the positive electrode structure 20 and negative electrode structure 22, and the auxiliary electrode 24 and the positive electrode structure 20, may be maintained such that the overall capacity of the positive electrode structure 20 for additional carrier ions is not exceeded. The positive electrode structure 20 may thus be maintained in a state where it has the ability to accept new carrier ions from the auxiliary electrode 24, which may allow for subsequent transfer of carrier ions to the negative electrode structure 22.

For example, in one embodiment, a voltage applied across the positive electrode structure 20 and the negative electrode structure 22, and a voltage applied across the auxiliary electrode 24 and the positive electrode structure 20, are selected to provide a rate of transfer of carrier ions between the positive electrode structure and negative electrode structure 22 that is greater than or equal to a rate of transfer of carrier ions between the auxiliary electrode 24 and the positive electrode structure 20. A rate of transfer of the carrier ions between electrodes may be related, for example, to a current between electrodes, which can be measured using a sensor. Accordingly, in one example a current between the auxiliary electrode 24 and the positive electrode structure 20 is lower than a current between the positive electrode structure 20 and the negative electrode structure 22, reflecting a lower rate of transfer of carrier ions between the auxiliary electrode 24 and positive electrode structure 20 as compared to a rate of transfer of carrier ions between the positive electrode structure 20 and the negative electrode structure 22. For example, in one embodiment, a current between the auxiliary electrode 24 and the positive electrode structure 20 may be 80% or less than that of a current between the positive electrode structure 20 and the negative electrode structure 22. By way of further example, in one embodiment a current between the auxiliary electrode 24 and the positive electrode structure 20 may be 60% or less than that of a current between the positive electrode structure 20 and the negative electrode structure 22. By way of yet another example, in one embodiment a current between the auxiliary electrode 24 and the positive electrode structure 20 may be 50% or less than that of a current between the positive electrode structure 20 and the negative electrode structure 22. By way of yet another example, in one embodiment a current between the auxiliary electrode 24 and the positive electrode structure 20 may be 30% or less than that of a current between the positive electrode structure 20 and the negative electrode structure 22. By way of yet another example, in one embodiment a current between the auxiliary electrode 24 and the positive electrode structure 20 may be 20% or less than that of a current between the positive electrode structure 20 and the negative electrode structure 22.

In one embodiment, without being limited by any particular theory, the carrier ions are transferred from the auxiliary electrode 24 to the positive electrode structure 20 as a part of the replenishment of the negative electrode structure 22 (as opposed to transferring from the auxiliary electrode 24 directly to the negative electrode structure 22), because the positive electrode structure 20 may be capable of more uniformly accepting carrier ions across the surface thereof, thus allowing the carrier ions to more uniformly participate in the transfer thereof between the positive electrode structure 20 and the negative electrode structure 22. In contrast, for certain materials used in the formation of negative electrode structures 22, such as silicon-containing materials, the transfer of carrier ions from an auxiliary electrode 24 directly to the negative electrode structure 22 can result in a non-uniform accumulation of carrier ions on the surface thereof, such as on a surface of the negative electrode structure 22 that is closest to the auxiliary electrode 24, thus limiting the ability of the accumulated carrier ions uniformly to participate in transfer between the positive electrode structure 20 and the negative electrode structure 22 in charge and discharge processes. Accordingly, by transferring carrier ions to the positive electrode structure 20 from the auxiliary electrode 24, a more uniform transfer of carrier ions to the negative electrode structure 22 can be provided, to enhance overall performance of the battery having the replenished negative electrode structure 22.

In general, the quantity of carrier ions transferred from the auxiliary electrode to the positive electrode (and then ultimately to the negative electrode) is sufficient to match the reversible capacity of the positive electrode to the discharge capacity of the negative electrode (wherein the negative electrode end of discharge voltage $V_{neg,eod}$ is greater than 0.4 V (vs Li) and less than 0.9 V (vs Li) when the secondary battery reaches the cell end of discharge voltage $V_{cell,eod}$). In one embodiment, the quantity of carrier ions transferred from the auxiliary electrode to the positive electrode is at least 10% of the reversible capacity of the positive electrode. For example, in one such embodiment the amount of carrier ion transferred from the auxiliary electrode to the positive electrode is at least 15% of the reversible coulombic capacity of the positive electrode. By way of further example, in one such embodiment the amount of carrier ion transferred from the auxiliary electrode to the positive electrode is at least 20% of the reversible coulombic capacity of the positive electrode. By way of further example, in one such embodiment the amount of carrier ion transferred from the auxiliary electrode to the positive electrode is at least 25% of the reversible coulombic capacity of the positive electrode. By way of further example, in one such embodiment the amount of carrier ion transferred from the auxiliary electrode to the positive electrode is at least 30% of the reversible coulombic capacity of the positive electrode. By way of further example, in one such embodiment the amount of carrier ion transferred from the auxiliary electrode to the positive electrode is at least 40% of the reversible coulombic capacity of the positive electrode. By way of further example, in one such embodiment the amount of carrier ion transferred from the auxiliary electrode to the positive electrode is at least 50% of the reversible coulombic capacity of the positive electrode.

Referring again to FIG. 5, a porous separator (not shown) is positioned between the positive electrode structure(s) 20 and negative electrode structure(s) 22 and between auxiliary electrode 24 and the positive and/or negative electrode structures. The porous separator material may comprise any of the porous materials conventionally used as secondary battery separators including, for example, microporous polyethylenes, polypropylenes, $TiO_2$-polymer composites, $SiO_2$, $Al_2O_3$, and the like (P. Arora and J. Zhang, "Battery Separators" Chemical Reviews 2004, 104, 4419-4462). Such materials may be deposited, for example, by electrophoretic deposition of a particulate separator material, slurry deposition (including spin or spray coating) of a particulate separator material, or sputter coating of an ionically conductive particulate separator material. In one embodiment the porous separator material comprises pores having a diameter of at least 50 Å, more typically in the range of about 2,500 Å, and a porosity in the range of about 25% to about 75%, more typically in the range of about 35-55%.

The porous separator material is permeated with a non-aqueous electrolyte that serves as a medium to conduct carrier ions between the positive electrode, the negative electrode, and the auxiliary electrode. In the general the non-aqueous electrolyte may be any of a range of non-aqueous electrolytes suitable for use as a secondary battery electrolyte. Typically, the non-aqueous electrolyte comprises a salt of the carrier ion, such as a magnesium, aluminum or lithium salt dissolved in an organic solvent. Exemplary lithium salts include inorganic lithium salts such as $LiClO_4$, $LiBF_4$, $LiPF_6$, $LiAsF_6$, LiCo, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers. Additional examples include alkoxy solutions with carrier ions, dichloro-complex electrolytes, organoborates, organohalates, organohaloaluminates, Grignard organohaloaluminates, borohydrides, phenolates and haloxides.

As illustrated in FIG. 5, the auxiliary electrode is a component of the finished secondary battery. In an alternative embodiment, the auxiliary electrode is removed from the secondary battery cell after replenishment of positive or negative electrode but prior to final packaging.

The inclusion of an auxiliary electrode in a secondary battery cell has important benefits in battery monitoring and maintenance. For example, the auxiliary electrode can serve as a reference electrode and is used for accurate measurements of state of charge and state of health measurements and enables measurement of the cell voltage versus state of charge relationship changes over time, or when the voltage of the battery is relatively independent of state of charge. For example, the auxiliary electrode can act as a reference electrode to shut off discharge when the voltage of the negative electrode exceeds a specified limit versus the auxiliary electrode; in one such embodiment, this could be implemented by sensing the voltage at the negative electrode relative to the auxiliary electrode with a sensor and a controller would then isolate the cell from the circuit it was powering when the predefined voltage limit is exceeded.

In one embodiment, when the state of charge of one of the electrodes is out of a predetermined range, the auxiliary electrode may be accessed to transfer carrier ions to the positive and/or negative electrode to restore the state of charge of the predetermined state of charge. For example, if at some point in the life of the secondary battery the control unit detects that the negative electrode has an end of discharge voltage $V_{neg,eod}$ value in excess of 0.9 V (vs. Li), the control unit may activate a transfer of carrier ions from the auxiliary electrode to the positive and/or negative electrode (as previously described) to restore $V_{neg,eod}$ to a value of less than 0.9 V (vs Li). By way of further example, if at some point in the life of the secondary battery the control unit detects that the negative electrode has an end of discharge voltage $V_{neg,eod}$ value in excess of 0.8 V (vs. Li), the control unit may activate a transfer of carrier ions from the auxiliary electrode to the positive and/or negative electrode (as previously described) to restore $V_{neg,eod}$ to a value of less than 0.8 V (vs Li). By way of further example, if at some point in the life of the secondary battery the control unit detects that the negative electrode has an end of discharge voltage $V_{neg,eod}$ value in excess of 0.7 V (vs. Li), the control unit may activate a transfer of carrier ions from the auxiliary electrode to the positive and/or negative electrode (as previously described) to restore $V_{neg,eod}$ to a value of less than 0.7 V (vs Li). By way of further example, if at some point in the life of the secondary battery the control unit detects that the negative electrode has an end of discharge voltage $V_{neg,eod}$ value in excess of 0.6 V (vs. Li), the control unit may activate a transfer of carrier ions from the auxiliary electrode to the positive and/or negative electrode (as previously described) to restore $V_{neg,eod}$ to a value of less than 0.6 V (vs Li).

In one alternative embodiment, carrier ions may be transferred from the positive to the auxiliary in order to restore the state of charge of the predetermined state of charge or to balance the electrodes. For example, some positive electrode materials have a first cycle loss that significantly exceeds the first cycle of the cell's negative electrode. In such embodiments, the difference in the first cycle losses of the positive and negative electrodes may be compensated by providing a negative electrode having a reversible coulombic capacity that significantly exceeds the reversible coulombic capacity of the positive electrode. Alternatively, or additionally, the difference in first cycle losses may be accommodated by transferring carrier ions from the positive electrode to the auxiliary electrode during formation of the battery.

Figure 6:
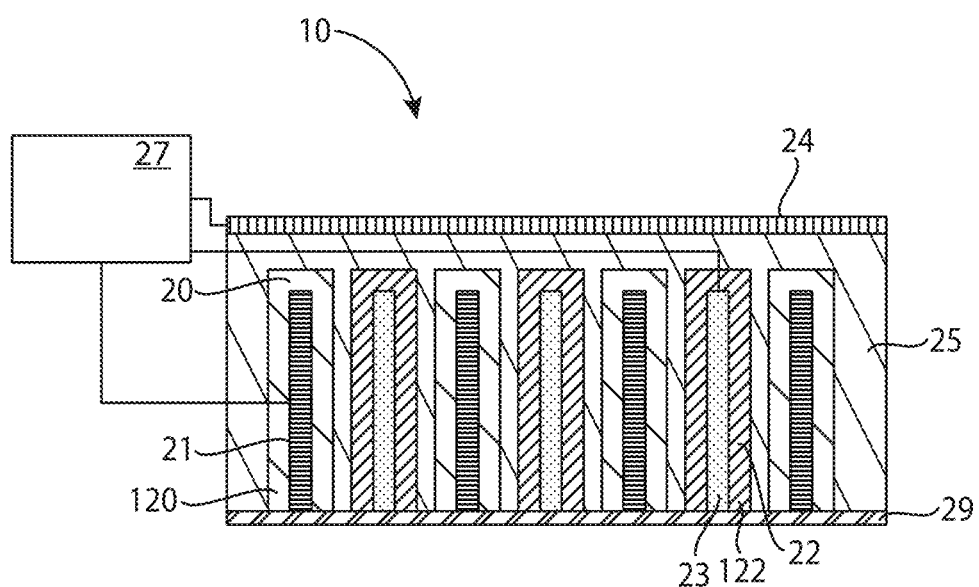
FIG. 6 is a schematic diagram of an alternative embodiment of a secondary battery of the present disclosure.

Referring now to FIG. 6, in one alternative embodiment secondary battery 10 comprises a plurality of positive electrode structures 20, a plurality of negative electrode structures 22, an auxiliary electrode 24, a control unit 27 and a substrate 29 supporting the positive and negative electrode structures. Each of the positive electrode structures comprises a positive electrode current collector 21 and a cathodically active material 120 overlying and in direct contact with positive electrode current collector 21. Each of the negative electrode structures also comprises a negative electrode current collector 23 and a anodically active material 122 overlying and in direct contact with negative electrode current collector 23. When secondary battery 10 comprises multiple positive electrode structures 20 as illustrated in FIG. 6, the positive electrode structures may be electrically coupled to each other. Similarly, when secondary battery 10 contains multiple negative electrode structures 22 as illustrated in FIG. 6, the negative electrode structures may be electrically coupled to each other. The control unit 27 comprises a sensor for sensing the cell voltage (i.e., the voltage differential between the positive and negative electrodes) and for sensing the voltage differential between the auxiliary electrode and (i) the positive electrode, (ii) the negative electrode or (iii) each of the positive and negative electrodes. The control unit further comprises a controller, in communication with the sensor, for controlling the charging and discharging operations of the battery, and the transfer of carrier ions from the auxiliary electrode to the positive and/or negative electrodes as described elsewhere herein.

In one embodiment, the anodically active material 122 is in the form of a layer having a thickness of about 1 to about 100 micrometers. For example, in one embodiment anodically active material 122 comprises porous silicon, has a thickness of about 5 to about 100 micrometers, and has a porosity fraction of about 0.15 to about 0.75. By way of further example, in one embodiment, anodically active material 122 comprises porous silicon, has a thickness of about 10 to about 80 micrometers, and has a porosity fraction of about 0.15 to about 0.7. By way of further example, in one such embodiment anodically active material 122 comprises porous silicon, has a thickness of about 20 to about 50 micrometers, and has a porosity fraction of about 0.25 to about 0.6. By way of further example, in one embodiment anodically active material 122 comprises a porous silicon alloy (such as nickel silicide), has a thickness of about 5 to about 100 micrometers, and has a porosity fraction of about 0.15 to about 0.75.

In an alternative embodiment anodically active material 122 comprises silicon nanowires, has a thickness of about 5 to about 100 micrometers, and has a porosity fraction of about 0.15 to about 0.75. For example in one such embodiment, anodically active material 122 comprises silicon nanowires, has a thickness of about 10 to about 80 micrometers, and has a porosity fraction of about 0.15 to about 0.7. By way of further example, in one such embodiment anodically active material 122 comprises silicon nanowires, has a thickness of about 20 to about 50 micrometers, and has a porosity fraction of about 0.25 to about 0.6. By way of further example, in one embodiment anodically active material 122 comprises nanowires of a silicon alloy (such as nickel silicide), has a thickness of about 5 to about 100 micrometers, and has a porosity fraction of about 0.15 to about 0.75.

Negative electrode current collector 23 will typically have a conductivity of at least about $10^3$ Siemens/cm. For example, in one such embodiment, negative electrode current collector 23 has a conductivity of at least about $10^4$ Siemens/cm. By way of further example, in one such embodiment negative electrode current collector 23 has a conductivity of at least about $10^5$ Siemens/cm. In general, negative electrode current collector 23 may comprise any metal or other conductor conventionally used as a current collector material for negative electrodes such as carbon, cobalt, chromium, copper, nickel, titanium, or an alloy of one or more thereof. Negative electrode current collector 23 and may be fabricated by processes such as electrodeposition, electroless deposition, immersion deposition, physical vapor deposition, chemical vapor deposition, and the like.

Separator 25 surrounds and electrically isolates each member 20 of the positive electrode structure population from each member 22 of the negative electrode structure population and comprises a microporous separator material that can be permeated with a non-aqueous electrolyte as previously described. For example, in one embodiment the microporous separator material comprises pores having a diameter of at least 50 Å, more typically in the range of about 2,500 Å, and a porosity in the range of about 25% to about 75%, more typically in the range of about 35-55%.

Separator 25 also electrically isolates auxiliary electrode 24 from positive electrode and negative electrode structures 20, 22. As illustrated, separator 25 may comprise the same microporous material in the region between auxiliary electrode 24 and negative electrode and positive electrode structures 20, 22 as in the region between positive electrode structures 20 and negative electrode structures 22. Alternatively, separator 25 may comprise a microporous material in the region between auxiliary electrode 24 and negative electrode and positive electrode structures 20, 22 that compositionally differs from the micro porous material in the region between positive electrode structures 20 and negative electrode structures 22.

In those embodiments in which the voltage difference between the auxiliary electrode and the positive electrode is greater than the voltage difference between the auxiliary electrode and the negative electrode between the charge and discharge voltage limits, the positive electrode may be replenished more rapidly than the negative electrode. Additionally, in those embodiments in which the transfer of carrier ions involves a phase change reaction, i.e., when converting crystalline silicon to amorphous silicon, a transfer of carrier ions directly from the auxiliary electrode to the negative electrode may produce a non-uniform concentration of the carrier ions in the negative electrode (the carrier ions will tend to concentrate at locations nearest the auxiliary electrode). Accordingly, in such embodiments it may be preferred to replenish the secondary battery by transferring carrier ions from the auxiliary electrode to the positive electrode and then to the negative electrode, rather than a direct transfer from the auxiliary electrode to the negative electrode. Nonetheless, there are some embodiments in which it may be advantageous to electrically couple the auxiliary electrode 24 to the negative electrode structure 22 instead of (or in addition to) the positive electrode structure 20 (and otherwise as illustrated in FIG. 6). For example, in one such embodiment the auxiliary electrode 24 is electrically coupled to the negative electrode structure 22 and has the capacity to function as an auxiliary negative electrode. A negative electrode structure 22 in combination with an auxiliary negative electrode can achieve better performance than a negative electrode alone.

As noted, secondary battery 10 comprises a population of negative electrode structures 22 and a population of positive electrode structures 20. As illustrated in FIG. 6, in one embodiment members of the two populations are interdigitated and stacked, in alternating sequence (i.e., negative electrode structure, positive electrode structure, negative electrode structure, positive electrode structure . . . ). For ease of illustration, the population of positive electrode structures includes four members 20 and the population of negative electrode structures includes three members 22 in FIG. 6; in practice, however, the population of negative electrode structures and the population of positive electrode structures may each comprise a greater or lesser number of members. For example, in one embodiment the population of negative electrode structures and the population of positive electrode structures comprised by a secondary cell of the present disclosure may each include at least 5 members. By way of further example, in one embodiment the population of negative electrode structures and the population of positive electrode structures each include at least 10 members. By way of further example, in one embodiment the population of negative electrode structures and the population of positive electrode structures each include at least 50 members. By way of further example, in one embodiment the population of negative electrode structures and the population of positive electrode structures each include at least 100 members.

As illustrated in FIG. 6, each member 22 of the negative electrode population is between two members 20 of the population of positive electrode structures such that the interdigitated series begins and ends with a positive electrode structure 20 and each negative electrode structure 22 is between two positive electrode structures 20 (e.g., a series of electrodes having the following repeat sequence: positive electrode, negative electrode, positive electrode, negative electrode, positive electrode . . . ). For example, in one such embodiment, the negative electrode structure population has N members, the positive electrode structure population has N+1 members, each negative electrode is between two positive electrodes, and N is at least 5, at least 10, at least 25, at least 50 or even at least 100.

In one alternative embodiment, with one exception, each member 22 of the population of negative electrode structures is between two members 20 of the positive electrode population and, with one exception, each member 20 of the population of positive electrodes is between two members 22 of the population of negative electrodes. Stated more generally, in one embodiment the positive electrode structure population and the negative electrode population each have N members, each of N-1 positive electrode structures is between two negative electrode structures, each of N-1 negative electrode structures is between two positive electrode structures, and N is at least 2. For example, in one embodiment, N is at least 4 (as illustrated in FIG. 4), at least 5, at least 10, at least 25, at least 50 or even at least 100.

In another alternative embodiment, for example, each member 20 of the population of positive electrode structures is between two members 22 of the population of negative electrode structures such that the interdigitated series begins and ends with a negative electrode structure 22 and each positive electrode structure 20 is between two negative electrode structures 22 (e.g., a series of electrodes having the following repeat sequence: negative electrode, positive electrode, negative electrode, positive electrode, negative electrode . . . ). In one such embodiment, the positive electrode structure population has N members, the negative electrode structure population has N+1 members, each positive electrode structure is between two negative electrode structures, and N is at least 5, at least 10, at least 25, at least 50 or even at least 100.

As illustrated in FIG. 6, auxiliary electrode 24 is shown as a unitary element. In certain embodiments, the auxiliary electrode may comprise a plurality of auxiliary electrode elements or portions. For example, in one embodiment the auxiliary electrode may comprise a layer of lithium metal deposited (e.g., sputter deposited) onto onto the positive electrode current collector(s), the negative electrode current collector(s), a substrate supporting the positive electrode structures, a substrate supporting the negative electrode structures (see, e.g., FIG. 6), or other surface or structure within the secondary battery such as the battery enclosure. Additionally, the auxiliary electrode may be consumed in the battery formation process, or it may contain sufficient lithium such that after formation the auxiliary electrode may be accessed to provide additional lithium to the positive or negative electrode structures.

Figure 7:
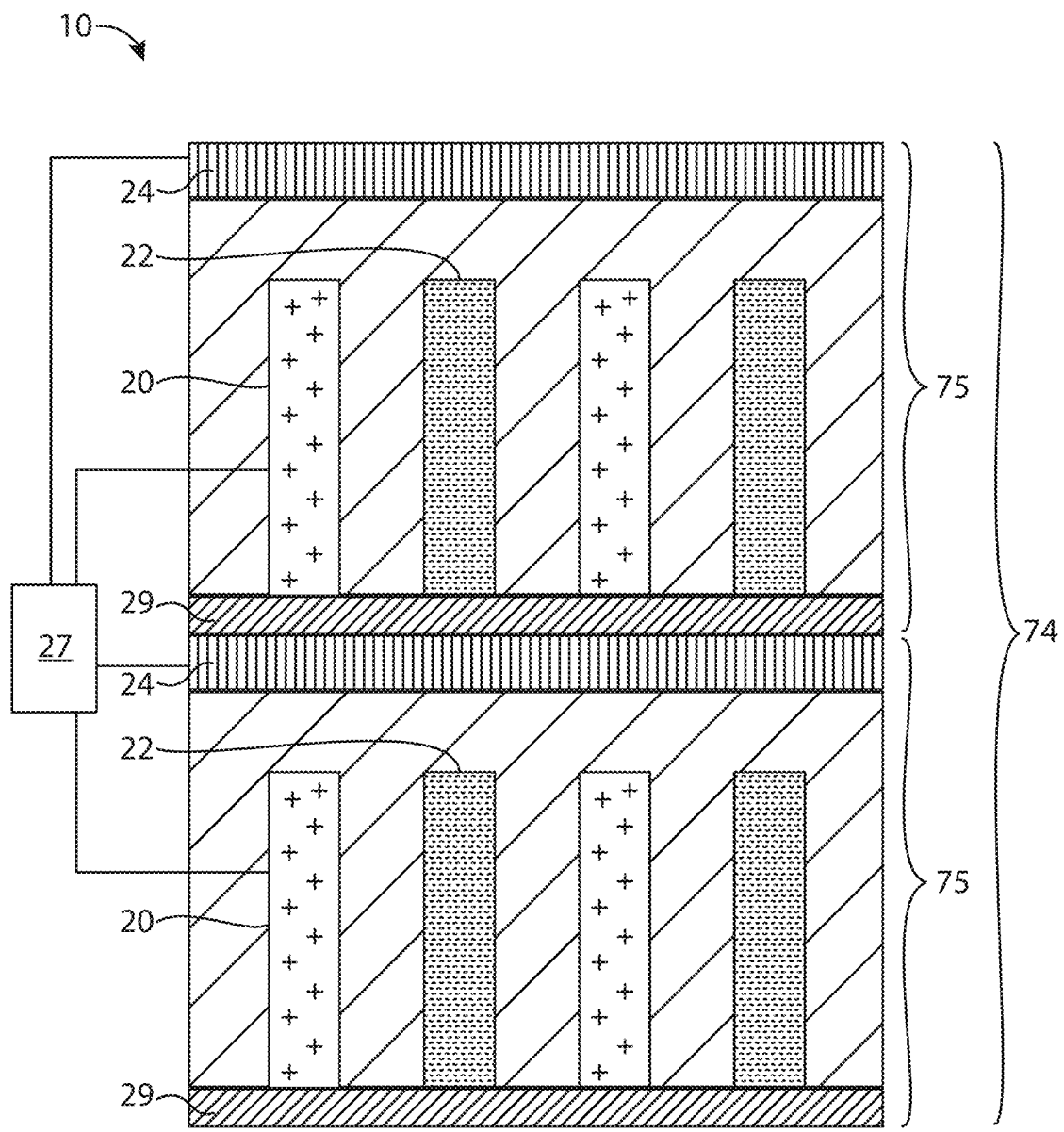
FIG. 7 is a schematic diagram of an alternative embodiment of a secondary battery of the present disclosure.

Referring now to FIG. 7, in one alternative embodiment secondary battery 10 comprises an electrode assembly stack 74 and a control unit 27. In this embodiment, electrode assembly stack 74 comprises two electrode assemblies 75, each comprising a population of positive electrode structures 20, a population of negative electrode structures 22, a substrate 29 supporting the positive and negative electrode structures and an auxiliary electrode 24. In this embodiment, the electrode assemblies are stacked relative to each other in a direction that is perpendicular to the planar substrate 29 and the populations of positive and negative electrode structures are stacked relative to each other within each electrode assembly 75 in a direction that is parallel to the planar substrate 29. The control unit 27 is electrically connected to the positive electrode structures, the negative electrode structures and auxiliary electrodes and is operable to replenish each of the electrode assemblies 75 with carrier ions, as previously described. For ease of illustration, each of the electrode assemblies 75 comprises a population of two negative electrode structures and a population of two positive electrode structures; in practice, each of these populations may comprise many more members. Additionally, in certain embodiments substrate 29 may be omitted in which case, the directions of stacking (as described in this paragraph) are in reference to an imaginary plane that parallels substrate 29.

Figure 8:
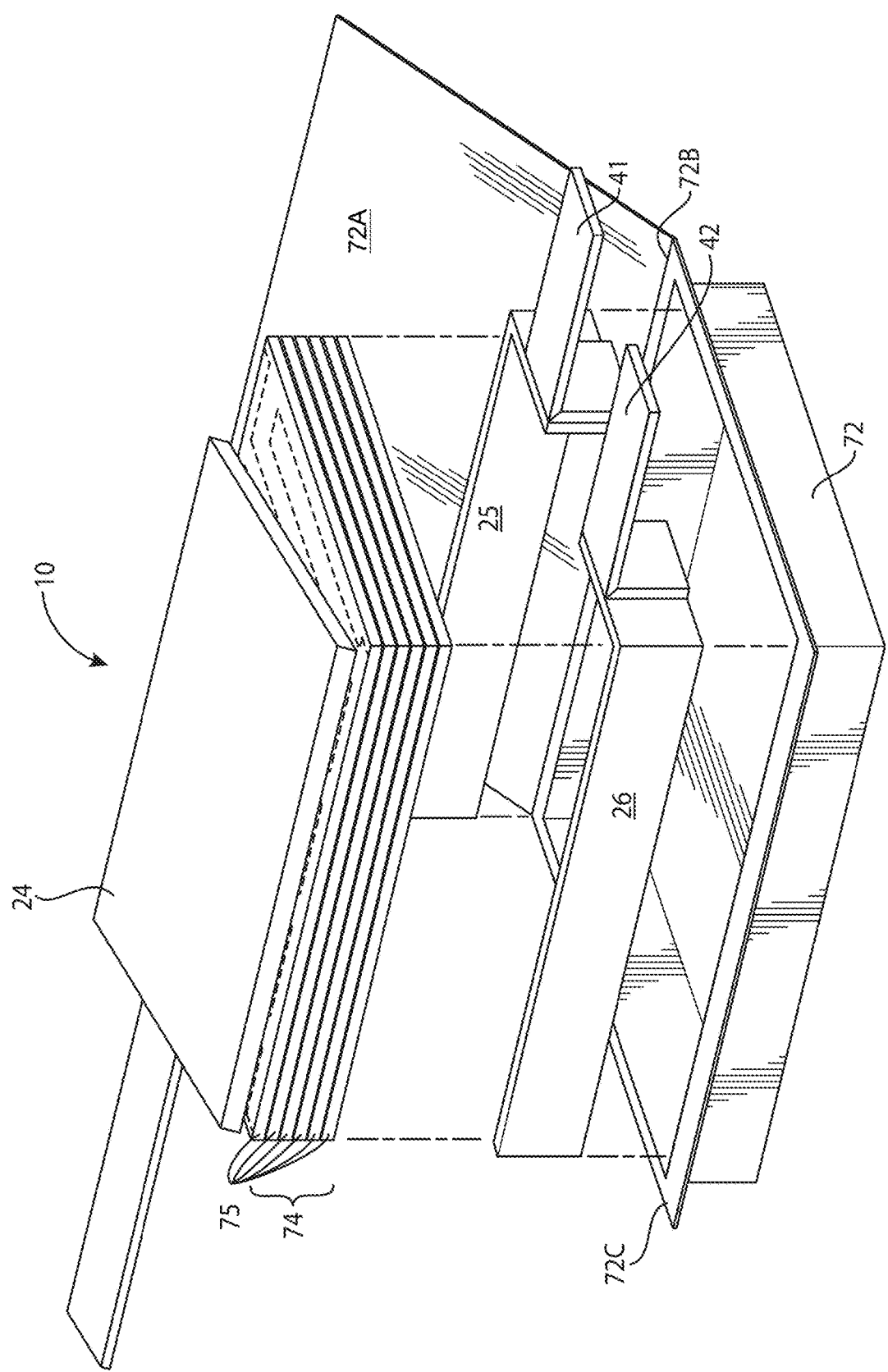
FIG. 8 is an exploded view of one embodiment of a secondary battery of the present disclosure.

Referring now to FIG. 8, in one embodiment a secondary battery 10 of the present disclosure comprises battery enclosure 72, electrode assembly stack 74, auxiliary electrode 24, negative electrode tab 41 and positive electrode tab 42 for electrically connecting electrode stack 74 to an external energy supply or consumer (not shown), and a control unit (not shown) comprising a sensor and controller as previously described. Electrode assembly stack 74 comprises a population of six electrode assemblies 75 stacked vertically relative to each other, with the direction of stacking being perpendicular to the direction of stacking of the positive and negative electrodes within each of the electrode assemblies 75 (see FIG. 9). The number of electrode assemblies 75 in an electrode assembly stack 74 is not critical and may range, for example, from 1 to 50, with 2 to 20 electrode structures in an electrode stack being typical. After filling the battery enclosure with a non-aqueous electrolyte, battery enclosure 72 may be sealed by folding lid 72A at hinge 72B and gluing lid 72A to upper surface 72C. As described in greater detail below, the auxiliary electrode 24 may be incorporated into (i.e., as a component of) the sealed secondary battery, or alternatively, it may be accessed during formation of the secondary battery and removed prior to sealing, as previously described.

Negative electrode tab extension 25 is electrically connected to each negative electrode structure 22 (see FIG. 9) of each electrode assembly 75 and positive electrode tab extension 26 is electrically connected to each positive electrode structure 20 (see FIG. 8) of each electrode assembly 75. Tab 41 may be electrically connected to negative electrode tab extension 25 using, for example, an electrically conductive glue and tab 42 may be electrically connected to positive electrode tab extension 26 using, for example, an electrically conductive glue. Alternatively, tabs 41, 42 may be the folded ends of negative electrode tab extension 25 and positive electrode tab extension 26, respectively.

Figure 9:
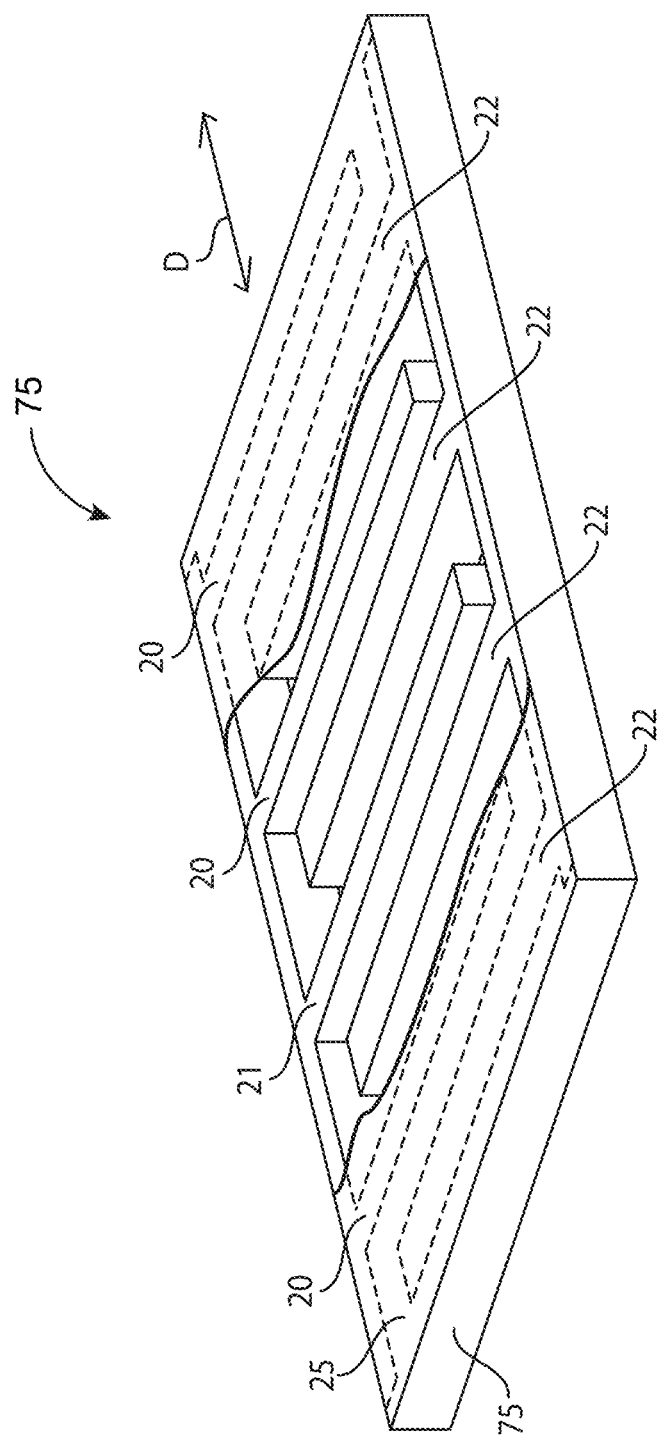
FIG. 9 is a schematic diagram of an electrode assembly comprised by the secondary battery of FIG. 7, with part cut-away to reveal internal construction.

Referring now to FIG. 9, each electrode assembly 75 comprises a population of negative electrode structures 22 and a population of positive electrode structures 20 and a porous separator (not shown) as more fully described in connection with FIGS. 5 and 6. Members of the two populations are interdigitated and stacked, in alternating sequence in direction D (which is perpendicular to the direction of stacking of the electrode assemblies 75 in electrode assembly stack 74 (see FIG. 7)).

Figure 10:
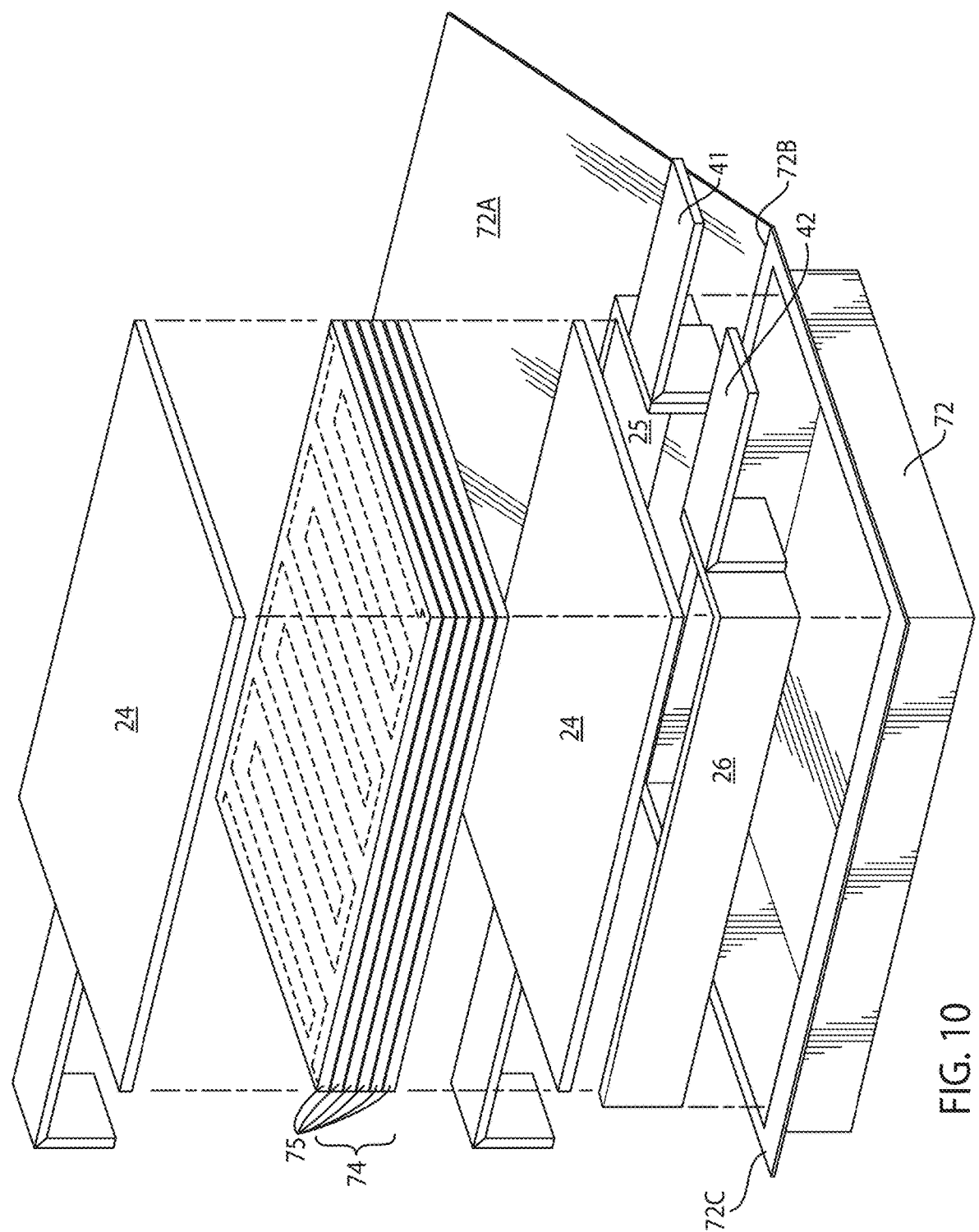
FIG. 10 is an exploded view of an alternative embodiment of a secondary battery of the present disclosure.

Referring now to FIG. 10, in one alternative embodiment a secondary battery 10 of the present disclosure is as otherwise described in connection with FIG. 9, but comprises two auxiliary electrode structures, one at the top and the other at the bottom of stack 74. A control unit (not shown) comprised by the battery is operable to replenish each of the electrode assemblies 75 from one or the other, or even both of the auxiliary electrode structures, as previously described.

Figure 11:
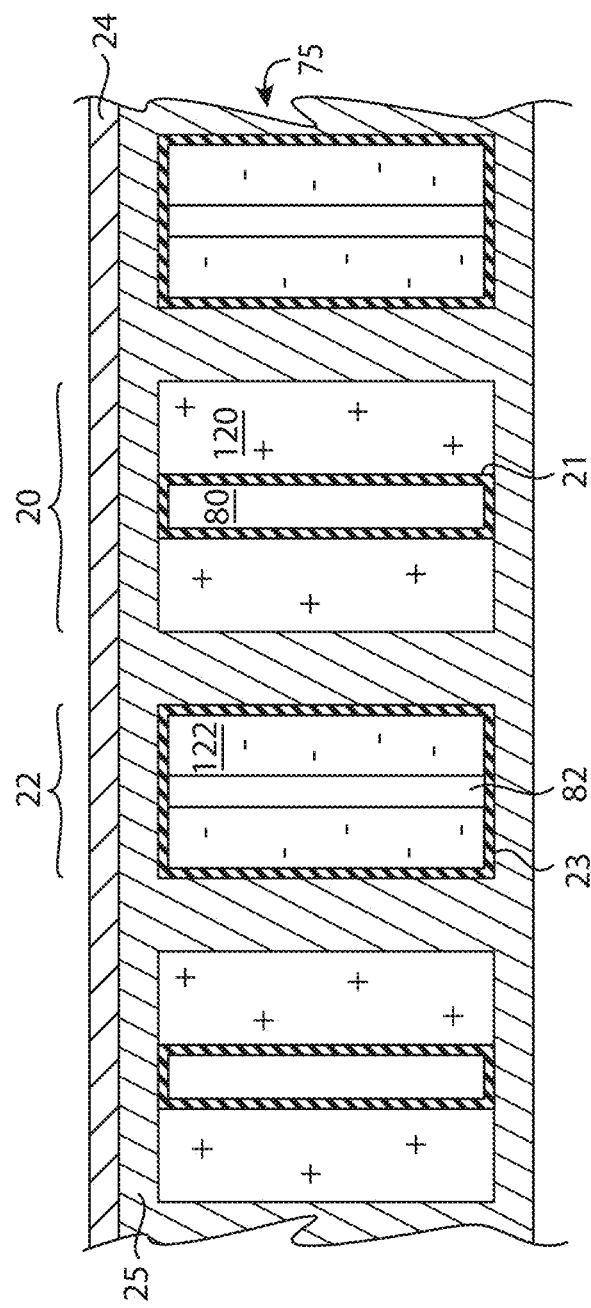
FIG. 11 is a schematic diagram of an alternative embodiment of an electrode assembly comprised by a secondary battery of the present disclosure.

Referring now to FIG. 11, in an alternative embodiment electrode assembly 75 comprises an auxiliary electrode 24 and a population of positive electrode structures 20 and negative electrode structures 22 that comprise positive electrode backbone 80 and negative electrode backbone 82, respectively. In addition, in this embodiment, each member 20 of the population of positive electrode structures comprises a current collector 21 that is located between backbone 80 and cathodically active material 120 and each member 22 of the population of negative electrode structures comprises a current collector 23 on its surface (i.e., at the interface between anodically active material 122 and separator 25. Backbone 80 and negative electrode backbone 82 provide mechanical stability for cathodically active material layer 120 and anodically active material layer 122, respectively. Typically, the backbones will have a thickness of at least 1 micrometer. Depending upon the application, positive electrode backbone 80 and negative electrode backbone 82 may independently be electrically conductive or insulating.

Figure 12:
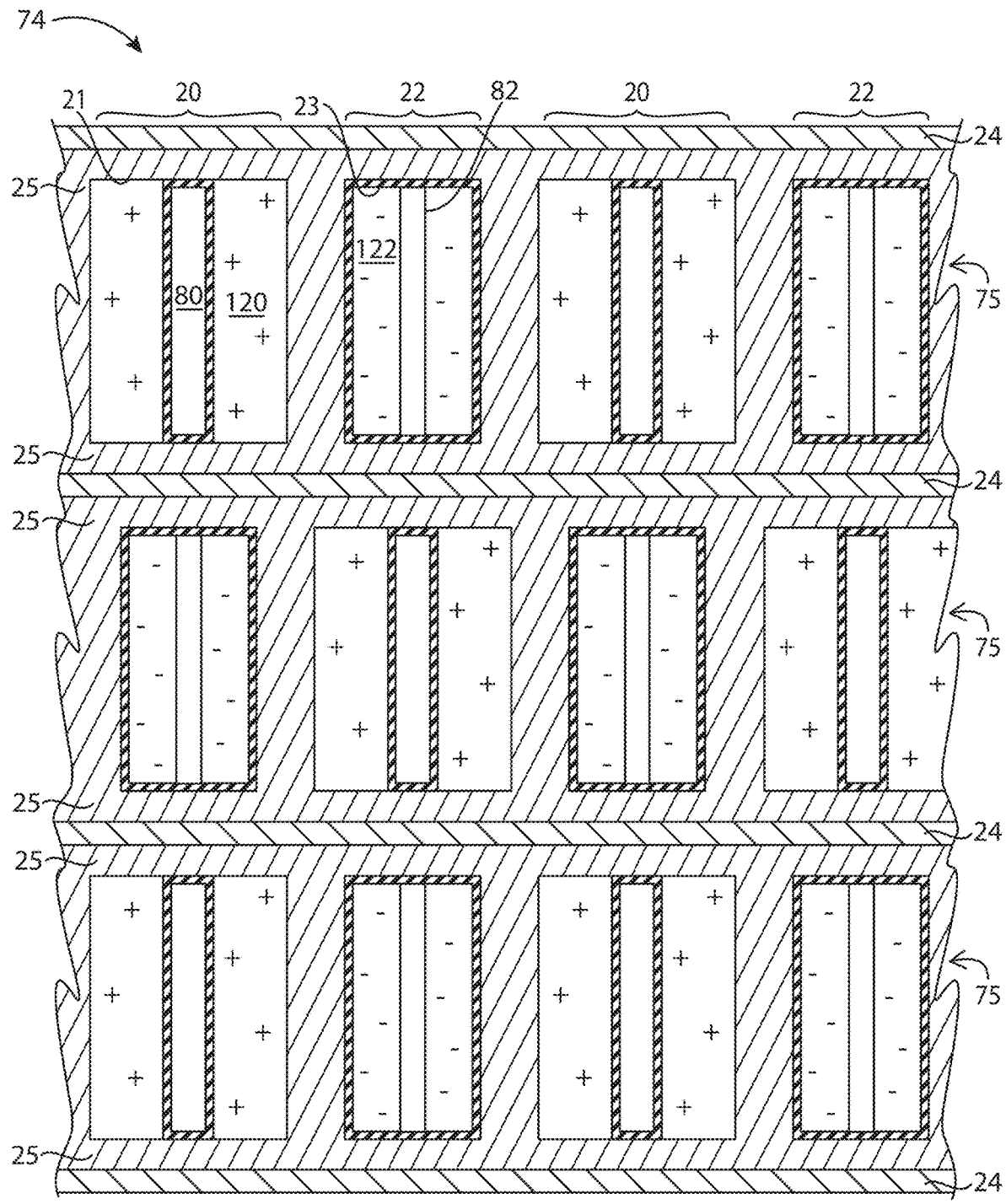
FIG. 12 is a schematic diagram of an alternative embodiment of an electrode assembly stack comprised by a secondary battery of the present disclosure.

Referring now to FIG. 12, in an alternative embodiment electrode assembly stack 74 is as otherwise described in connection with FIGS. 7 and 11, but in this embodiment the electrode assembly stack 74 comprises more auxiliary electrode structures 24 than electrode assemblies in the electrode assembly stack. A control unit (not shown) comprised by a battery would be operable to replenish each of the electrode assemblies 75 from one or more of the auxiliary electrode structures, as previously described.

In further embodiments, numbered 1-84 below, aspects of the present disclosure include:

Embodiment 1. A method for activating a secondary battery, the secondary battery comprising a negative electrode, a positive electrode, a microporous separator between the negative and positive electrodes permeated with a carrier ion-containing electrolyte in ionic contact with the negative and positive electrodes, and a control unit, the negative electrode comprising anodically active silicon or an alloy thereof and having a coulombic capacity for the carrier ions, the positive electrode comprising a cathodically active material and having a coulombic capacity for the carrier ions, the negative electrode coulombic capacity exceeding the positive electrode coulombic capacity, the method comprising
 (i) transferring carrier ions from the positive electrode to the negative electrode to at least partially charge the secondary battery wherein a solid electrolyte interphase is formed on a surface of the negative electrode during the transfer,
 (ii) after step (i), transferring carrier ions from an auxiliary electrode to the positive electrode,
 (iii) after step (ii), transferring carrier ions from the positive electrode to the negative electrode to charge the secondary battery, and
 (iv) programming the control unit with a predefined cell end of discharge voltage $V_{cell,eod}$ value,
 wherein the activated secondary battery has a positive electrode end of discharge voltage $V_{pos,eod}$ and a negative electrode end of discharge voltage $V_{neg,eod}$ when the cell is at the predefined $V_{cell,eod}$ value, the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li).

Embodiment 2. The process of embodiment 1 wherein the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li) when the cell is at $V_{cell,eod}$.

Embodiment 3. The process of embodiment 1 wherein the value of $V_{pos,eod}$ corresponds to a voltage at which the state of charge of the positive electrode is at least 96% of its coulombic capacity and $V_{neg,eod}$ is at least 0.4 V (vs Li) but less than 0.9 V (vs Li) when the cell is at $V_{cell,eod}$.

Embodiment 4. The process of embodiment 1 wherein the value of $V_{pos,eod}$ corresponds to a voltage at which the state of charge of the positive electrode is at least 97% of its coulombic capacity and $V_{neg,eod}$ is at least 0.4 V (vs Li) but less than 0.9 V (vs Li) when the cell is at $V_{cell,eod}$.

Embodiment 5. The process of embodiment 1 wherein the value of $V_{pos,eod}$ corresponds to a voltage at which the state of charge of the positive electrode is at least 98% of its coulombic capacity and $V_{neg,eod}$ is at least 0.4 V (vs Li) but less than 0.9 V (vs Li) when the cell is at $V_{cell,eod}$.

Embodiment 6. The process of embodiment 1 wherein the value of $V_{pos,eod}$ corresponds to a voltage at which the state of charge of the positive electrode is at least 99% of its coulombic capacity and $V_{neg,eod}$ is at least 0.4 V (vs Li) but less than 0.9 V (vs Li) when the cell is at $V_{cell,eod}$.

Embodiment 7. The process of any of embodiments 1 to 6 wherein $V_{neg,eod}$ is at least 0.4 V (vs Li) but less than 0.8 V (vs Li) when the cell is at $V_{cell,eod}$.

Embodiment 8. The process of any of embodiments 1 to 6 wherein $V_{neg,eod}$ is at least 0.5 V (vs Li) but less than 0.8 V (vs Li) when the cell is at $V_{cell,eod}$.

Embodiment 9. The process of any of embodiments 1 to 6 wherein $V_{neg,eod}$ is at least 0.4 V (vs Li) but less than 0.7 V (vs Li) when the cell is at $V_{cell,eod}$.

Embodiment 10. The process of any of embodiments 1 to 6 wherein $V_{neg,eod}$ is at least 0.5 V (vs Li) but less than 0.7 V (vs Li) when the cell is at $V_{cell,eod}$.

Embodiment 11. A secondary battery comprising a negative electrode, a positive electrode, a microporous separator between the negative and positive electrodes permeated with a carrier ion-containing electrolyte in ionic contact with the negative and positive electrodes, an auxiliary electrode, and a control unit, wherein
  the positive electrode comprises a cathodically active material and has a coulombic capacity for the carrier ions,
  the negative electrode comprises anodically active silicon or an alloy thereof and has a coulombic capacity for the carrier ions that exceeds the positive electrode coulombic capacity,
  the control unit comprises a controller and a sensor electrically coupled to the sensor,
  the sensor is configured to measure a cell voltage of the secondary battery during operation of the secondary battery and to measure the voltage of the positive or negative electrode relative to the auxiliary electrode,
  the controller comprising a predefined cell end of charge voltage $V_{cell,eoc}$ value and a predefined cell end of discharge voltage $V_{cell,eod}$ value, and
  the positive electrode has an end of discharge voltage $V_{pos,eod}$ and the negative electrode has an end of discharge voltage $V_{neg,eod}$ when the cell is at the predefined $V_{cell,eod}$, the value of $V_{pos,eod}$ corresponding to a voltage at which the state of charge of the positive electrode is at least 95% of its coulombic capacity and $V_{neg,eod}$ is at least 0.4 V (vs Li) but less than 0.9 V (vs Li).

Embodiment 12. The secondary battery of embodiment 11 wherein controller is programmed to transfer carrier ions from the auxiliary electrode to the positive or negative electrode when the value of $V_{neg,eod}$ is in excess of 0.9 V (vs Li) when the secondary battery is the predefined $V_{cell,eod}$ value at the end of a discharge cycle of the secondary battery.

Embodiment 13. The secondary battery of embodiment 11 wherein controller is programmed to transfer carrier ions from the auxiliary electrode to the positive or negative electrode when the value of $V_{neg,eod}$ is in excess of 0.8 V (vs Li) when the secondary battery is the predefined $V_{cell,eod}$ value at the end of a discharge cycle of the secondary battery.

Embodiment 14. The secondary battery of embodiment 11 wherein controller is programmed to transfer carrier ions from the auxiliary electrode to the positive or negative electrode when the value of $V_{neg,eod}$ is in excess of 0.7 V (vs Li) when the secondary battery is the predefined $V_{cell,eod}$ value at the end of a discharge cycle of the secondary battery.

Embodiment 15. The secondary battery of embodiment 11 wherein controller is programmed to transfer carrier ions from the auxiliary electrode to the positive or negative electrode when the value of $V_{neg,eod}$ is in excess of 0.6 V (vs Li) when the secondary battery is the predefined $V_{cell,eod}$ value at the end of a discharge cycle of the secondary battery.

Embodiment 16. The secondary battery of embodiment 11 wherein controller is programmed to transfer carrier ions from the auxiliary electrode to the positive or negative electrode when the value of $V_{neg,eod}$ is in excess of 0.5 V (vs Li) when the secondary battery is the predefined $V_{cell,eod}$ value at the end of a discharge cycle of the secondary battery.

Embodiment 17. The method of any of embodiments 1 to 10 or the secondary battery of embodiments 11 to 16 wherein the carrier ions are lithium, sodium, potassium, magnesium or aluminum ions.

Embodiment 18. The method of any of embodiments 1 to 10 or the secondary battery of embodiments 11 to 16 wherein the carrier ions are lithium, magnesium or aluminum ions.

Embodiment 19. The method of any of embodiments 1 to 10 or the secondary battery of embodiments 11 to 16 wherein the carrier ions are lithium ions.

Embodiment 20. The method of any of embodiments 1 to 10 or the secondary battery of embodiments 11 to 16 wherein the carrier ions are magnesium ions.

Embodiment 21. The method or secondary battery of any preceding embodiment wherein a ratio of the reversible coulombic capacity of the negative electrode to the reversible coulombic capacity of the positive electrode is at least 1.2:1, respectively, when cycled against a counter-electrode.

Embodiment 22. The method or secondary battery of any preceding embodiment wherein a ratio of the reversible coulombic capacity of the negative electrode to the reversible coulombic capacity of the positive electrode is at least 1.3:1, respectively, when cycled against a counter-electrode.

Embodiment 23. The method or secondary battery of any preceding embodiment wherein a ratio of the reversible coulombic capacity of the negative electrode to the reversible coulombic capacity of the positive electrode is at least 1.5:1, respectively, when cycled against a counter-electrode.

Embodiment 24. The method or secondary battery of any preceding embodiment wherein a ratio of the reversible coulombic capacity of the negative electrode to the reversible coulombic capacity of the positive electrode is at least 2:1, respectively, when cycled against a counter-electrode.

Embodiment 25. The method or secondary battery of any preceding embodiment wherein a ratio of the reversible coulombic capacity of the negative electrode to the reversible coulombic capacity of the positive electrode is at least 3:1, respectively, when cycled against a counter-electrode.

Embodiment 26. The method or secondary battery of any preceding embodiment wherein a ratio of the reversible coulombic capacity of the negative electrode to the reversible coulombic capacity of the positive electrode is at least 4:1, respectively, when cycled against a counter-electrode.

Embodiment 27. The method or secondary battery of any preceding embodiment wherein a ratio of the reversible coulombic capacity of the negative electrode to the reversible coulombic capacity of the positive electrode is at least 5:1, respectively, when cycled against a counter-electrode.

Embodiment 28. The method or secondary battery of any preceding embodiment wherein a ratio of the coulombic capacity of the auxiliary electrode to the reversible coulombic capacity of the positive electrode is at least 1.2:1, respectively, when cycled against a counter-electrode.

Embodiment 29. The method or secondary battery of any preceding embodiment wherein a ratio of the coulombic capacity of the auxiliary electrode to the reversible coulombic capacity of the positive electrode is at least 1.3:1, respectively, when cycled against a counter-electrode.

Embodiment 30. The method or secondary battery of any preceding embodiment wherein a ratio of the coulombic capacity of the auxiliary electrode to the reversible coulombic capacity of the positive electrode is at least 1.5:1, respectively, when cycled against a counter-electrode.

Embodiment 31. The method or secondary battery of any preceding embodiment wherein a ratio of the coulombic capacity of the auxiliary electrode to the reversible coulombic capacity of the positive electrode is at least 2:1, respectively, when cycled against a counter-electrode.

Embodiment 32. The method or secondary battery of any preceding embodiment wherein a ratio of the coulombic capacity of the auxiliary electrode to the reversible coulombic capacity of the positive electrode is at least 3:1, respectively, when cycled against a counter-electrode.

Embodiment 33. The method or secondary battery of any preceding embodiment wherein a ratio of the coulombic capacity of the auxiliary electrode to the reversible coulombic capacity of the positive electrode is at least 4:1, respectively, when cycled against a counter-electrode.

Embodiment 34. The method or secondary battery of any preceding embodiment wherein a ratio of the coulombic capacity of the auxiliary electrode to the reversible coulombic capacity of the positive electrode is at least 5:1, respectively, when cycled against a counter-electrode.

Embodiment 35. The method or secondary battery of any preceding embodiment wherein the negative electrode comprises a microstructured silicon-containing active material that contains a significant void volume fraction to accommodate volume expansion and contraction as carrier ions are incorporated into or leave the negative electrode during charging and discharging cycles.

Embodiment 36. The method or secondary battery of embodiment 35 wherein the void volume fraction of the anodically active material is at least 0.1.

Embodiment 37. The method or secondary battery of embodiment 35 or 36 wherein the void volume fraction of the anodically active material is not greater than 0.8.

Embodiment 38. The method or secondary battery of embodiment 35 or 36 wherein the void volume fraction of the anodically active material is about 0.15 to about 0.75.

Embodiment 39. The method or secondary battery of embodiment 35 or 36 wherein the void volume fraction of the anodically active material is about 0.2 to about 0.7.

Embodiment 40. The method or secondary battery of embodiment 35 or 36 wherein the void volume fraction of the anodically active material is about 0.25 to about 0.6.

Embodiment 41. The method or secondary battery of embodiment 35 or 36 wherein the microstructured anodically active material comprises macroporous, microporous or mesoporous material layers or a combination thereof.

Embodiment 42. A method for activating a secondary battery, the secondary battery comprising a negative electrode, a positive electrode, a microporous separator between the negative and positive electrodes permeated with a carrier ion-containing electrolyte in ionic contact with the negative and positive electrodes, and a control unit programmed with a predefined cell end of discharge voltage $V_{cell,eod}$ value, the negative electrode comprising anodically active silicon or an alloy thereof and having a coulombic capacity for the carrier ions, the positive electrode comprising a cathodically active material and having a coulombic capacity for the carrier ions, the negative electrode coulombic capacity exceeding the positive electrode coulombic capacity, the method comprising:

(i) transferring carrier ions from the positive electrode to the negative electrode to at least partially charge the secondary battery wherein a solid electrolyte interphase is formed on a surface of the negative electrode during the transfer, and (ii) transferring carrier ions from an auxiliary electrode to the positive electrode, to provide the secondary battery with a positive electrode end of discharge voltage $V_{pos,eod}$ and a negative electrode end of discharge voltage $V_{neg,eod}$ when the cell is at the predefined $V_{cell,eod}$ value, wherein the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li).

Embodiment 43. The process of embodiment 42, wherein step (ii) is performed after or simultaneously with step (i).

Embodiment 44. The process of embodiment 43, wherein in a case where step (ii) is performed after step (i), the process further comprises step (iii) of transferring, after step (ii), carrier ions from the positive electrode to the negative electrode to charge the secondary battery.

Embodiment 45. The process of embodiment 43, wherein step (ii) is performed simultaneously with step (i), and wherein step (ii) comprises transferring carrier ions from the auxiliary electrode to the positive electrode at a first rate, and step (i) comprises transferring carrier ions from the positive electrode to the negative electrode at a second rate, the second rate being higher that the first rate.

Embodiment 46. The process of embodiment 42 wherein the value of $V_{pos,eod}$ corresponds to a voltage at which the state of charge of the positive electrode is at least 95% of its coulombic capacity and $V_{neg,eod}$ is at least 0.4 V (vs Li) but less than 0.9 V (vs Li) when the cell is at $V_{cell,eod}$.

Embodiment 47. The process of embodiment 42 wherein the value of $V_{pos,eod}$ corresponds to a voltage at which the state of charge of the positive electrode is at least 96% of its coulombic capacity and $V_{neg,eod}$ is at least 0.4 V (vs Li) but less than 0.9 V (vs Li) when the cell is at $V_{cell,eod}$.

Embodiment 48. The process of embodiment 42 wherein the value of $V_{pos,eod}$ corresponds to a voltage at which the state of charge of the positive electrode is at least 97% of its coulombic capacity and $V_{neg,eod}$ is at least 0.4 V (vs Li) but less than 0.9 V (vs Li) when the cell is at $V_{cell,eod}$.

Embodiment 49. The process of embodiment 42 wherein the value of $V_{pos,eod}$ corresponds to a voltage at which the state of charge of the positive electrode is at least 98% of its coulombic capacity and $V_{neg,eod}$ is at least 0.4 V (vs Li) but less than 0.9 V (vs Li) when the cell is at $V_{cell,eod}$.

Embodiment 50. The process of embodiment 42 wherein the value of $V_{pos,eod}$ corresponds to a voltage at which the state of charge of the positive electrode is at least 99% of its coulombic capacity and $V_{neg,eod}$ is at least 0.4 V (vs Li) but less than 0.9 V (vs Li) when the cell is at $V_{cell,eod}$.

Embodiment 51. The process of any of embodiments 42 to 50 wherein $V_{neg,eod}$ is at least 0.4 V (vs Li) but less than 0.8 V (vs Li) when the cell is at $V_{cell,eod}$.

Embodiment 52. The process of any of embodiments 42 to 50 wherein $V_{neg,eod}$ is at least 0.5 V (vs Li) but less than 0.8 V (vs Li) when the cell is at $V_{cell,eod}$.

Embodiment 53. The process of any of embodiments 42 to 50 wherein $V_{neg,eod}$ is at least 0.4 V (vs Li) but less than 0.7 V (vs Li) when the cell is at $V_{cell,eod}$.

Embodiment 54. The process of any of embodiments 42 to 50 wherein $V_{neg,eod}$ is at least 0.5 V (vs Li) but less than 0.7 V (vs Li) when the cell is at $V_{cell,eod}$.

Embodiment 55. A secondary battery comprising a negative electrode, a positive electrode, a microporous separator between the negative and positive electrodes permeated with a carrier ion-containing electrolyte in ionic contact with the negative and positive electrodes, an auxiliary electrode, and a control unit, wherein
the positive electrode comprises a cathodically active material and has a coulombic capacity for the carrier ions,
the negative electrode comprises anodically active silicon or an alloy thereof and has a coulombic capacity for the carrier ions that exceeds the positive electrode coulombic capacity,
the control unit comprises a controller and a sensor electrically coupled to the sensor,
the sensor is configured to measure a cell voltage of the secondary battery during operation of the secondary battery and to measure the voltage of the positive or negative electrode relative to the auxiliary electrode,
the controller is programmed with a predefined cell end of charge voltage $V_{cell,eoc}$ value and a predefined cell end of discharge voltage $V_{cell,eod}$ value, and
the positive electrode has an end of discharge voltage $V_{pos,eod}$ and the negative electrode has an end of discharge voltage $V_{neg,eod}$ when the cell is at the predefined $V_{cell,eod}$, the value of $V_{pos,eod}$ corresponding to a voltage at which the state of charge of the positive electrode is at least 95% of its coulombic capacity and $V_{neg,eod}$ is at least 0.4 V (vs Li) but less than 0.9 V (vs Li).

Embodiment 56. The secondary battery of embodiment 55 wherein controller is programmed to transfer carrier ions from the auxiliary electrode to the positive or negative electrode when the value of $V_{neg,eod}$ is in excess of 0.9 V (vs Li) when the secondary battery is the predefined $V_{cell,eod}$ value at the end of a discharge cycle of the secondary battery.

Embodiment 57. The secondary battery of embodiment 55 wherein controller is programmed to transfer carrier ions from the auxiliary electrode to the positive or negative electrode when the value of $V_{neg,eod}$ is in excess of 0.8 V (vs Li) when the secondary battery is the predefined $V_{cell,eod}$ value at the end of a discharge cycle of the secondary battery.

Embodiment 58. The secondary battery of embodiment 55 wherein controller is programmed to transfer carrier ions from the auxiliary electrode to the positive or negative electrode when the value of $V_{neg,eod}$ is in excess of 0.7 V (vs Li) when the secondary battery is the predefined $V_{cell,eod}$ value at the end of a discharge cycle of the secondary battery.

Embodiment 59. The secondary battery of embodiment 55 wherein controller is programmed to transfer carrier ions from the auxiliary electrode to the positive or negative electrode when the value of $V_{neg,eod}$ is in excess of 0.6 V (vs Li) when the secondary battery is the predefined $V_{cell,eod}$ value at the end of a discharge cycle of the secondary battery.

Embodiment 60. The secondary battery of embodiment 55 wherein controller is programmed to transfer carrier ions from the auxiliary electrode to the positive or negative electrode when the value of $V_{neg,eod}$ is in excess of 0.5 V (vs Li) when the secondary battery is the predefined $V_{cell,eod}$ value at the end of a discharge cycle of the secondary battery.

Embodiment 61. The method of any of embodiments 42 to 54 or the secondary battery of embodiments 55 to 60 wherein the carrier ions are lithium, sodium, potassium, magnesium or aluminum ions.

Embodiment 62. The method of any of embodiments 42 to 54 or the secondary battery of embodiments 55 to 60 wherein the carrier ions are lithium, magnesium or aluminum ions.

Embodiment 62. The method of any of embodiments 42 to 54 or the secondary battery of embodiments 55 to 60 wherein the carrier ions are lithium ions.

Embodiment 63. The method of any of embodiments 42 to 54 or the secondary battery of embodiments 55 to 60 wherein the carrier ions are magnesium ions.

Embodiment 64. The method or secondary battery of any preceding embodiment wherein a ratio of the reversible coulombic capacity of the negative electrode to the reversible coulombic capacity of the positive electrode is at least 1.2:1, respectively, when cycled against a counter-electrode.

Embodiment 65. The method or secondary battery of any preceding embodiment wherein a ratio of the reversible coulombic capacity of the negative electrode to the reversible coulombic capacity of the positive electrode is at least 1.3:1, respectively, when cycled against a counter-electrode.

Embodiment 66. The method or secondary battery of any preceding embodiment wherein a ratio of the reversible coulombic capacity of the negative electrode to the reversible coulombic capacity of the positive electrode is at least 1.5:1, respectively, when cycled against a counter-electrode.

Embodiment 67. The method or secondary battery of any preceding embodiment wherein a ratio of the reversible coulombic capacity of the negative electrode to the reversible coulombic capacity of the positive electrode is at least 2:1, respectively, when cycled against a counter-electrode.

Embodiment 68. The method or secondary battery of any preceding embodiment wherein a ratio of the reversible coulombic capacity of the negative electrode to the reversible coulombic capacity of the positive electrode is at least 3:1, respectively, when cycled against a counter-electrode.

Embodiment 69. The method or secondary battery of any preceding embodiment wherein a ratio of the reversible coulombic capacity of the negative electrode to the reversible coulombic capacity of the positive electrode is at least 4:1, respectively, when cycled against a counter-electrode.

Embodiment 70. The method or secondary battery of any preceding embodiment wherein a ratio of the reversible coulombic capacity of the negative electrode to the reversible coulombic capacity of the positive electrode is at least 5:1, respectively, when cycled against a counter-electrode.

Embodiment 71. The method or secondary battery of any preceding embodiment wherein a ratio of the coulombic capacity of the auxiliary electrode to the reversible coulombic capacity of the positive electrode is at least 1.2:1, respectively, when cycled against a counter-electrode.

Embodiment 72. The method or secondary battery of any preceding embodiment wherein a ratio of the coulombic capacity of the auxiliary electrode to the reversible coulombic capacity of the positive electrode is at least 1.3:1, respectively, when cycled against a counter-electrode.

Embodiment 73. The method or secondary battery of any preceding embodiment wherein a ratio of the coulombic capacity of the auxiliary electrode to the reversible coulombic capacity of the positive electrode is at least 1.5:1, respectively, when cycled against a counter-electrode.

Embodiment 74. The method or secondary battery of any preceding embodiment wherein a ratio of the coulombic capacity of the auxiliary electrode to the reversible coulombic capacity of the positive electrode is at least 2:1, respectively, when cycled against a counter-electrode.

Embodiment 75. The method or secondary battery of any preceding embodiment wherein a ratio of the coulombic capacity of the auxiliary electrode to the reversible coulombic capacity of the positive electrode is at least 3:1, respectively, when cycled against a counter-electrode.

Embodiment 76. The method or secondary battery of any preceding embodiment wherein a ratio of the coulombic capacity of the auxiliary electrode to the reversible coulombic capacity of the positive electrode is at least 4:1, respectively, when cycled against a counter-electrode.

Embodiment 77. The method or secondary battery of any preceding embodiment wherein a ratio of the coulombic capacity of the auxiliary electrode to the reversible coulombic capacity of the positive electrode is at least 5:1, respectively, when cycled against a counter-electrode.

Embodiment 78. The method or secondary battery of any preceding embodiment wherein the negative electrode comprises a microstructured silicon-containing active material that contains a significant void volume fraction to accommodate volume expansion and contraction as carrier ions are incorporated into or leave the negative electrode during charging and discharging cycles.

Embodiment 79. The method or secondary battery of embodiment 78 wherein the void volume fraction of the anodically active material is at least 0.1.

Embodiment 80. The method or secondary battery of embodiment 78 wherein the void volume fraction of the anodically active material is not greater than 0.8.

Embodiment 81. The method or secondary battery of embodiment 78 wherein the void volume fraction of the anodically active material is about 0.15 to about 0.75.

Embodiment 82. The method or secondary battery of embodiment 78 wherein the void volume fraction of the anodically active material is about 0.2 to about 0.7.

Embodiment 83. The method or secondary battery of embodiment 78 wherein the void volume fraction of the anodically active material is about 0.25 to about 0.6.

Embodiment 84. The method or secondary battery of embodiment 78 wherein the microstructured anodically active material comprises macroporous, microporous or mesoporous material layers or a combination thereof.

As various changes could be made in the above articles, compositions and methods without departing from the scope of the disclosure, it is intended that all matter contained in the above description and shown in the accompanying drawings shall be interpreted as illustrative and not in a limiting sense.

What is claimed is:

1. A method of cycling a secondary battery between a charged state and a discharged state, the secondary battery comprising a negative electrode, a positive electrode, a microporous separator between the negative and positive electrodes permeated with a carrier ion-containing electrolyte in ionic contact with the negative and positive electrodes, and a controller, wherein the positive electrode comprises a cathodically active material and has a positive electrode coulombic capacity for the carrier ions, the negative electrode comprises anodically active silicon or an alloy thereof and has a negative electrode coulombic capacity for the carrier ions that exceeds the positive electrode coulombic capacity, the controller is programmed with a predefined cell end of charge voltage $V_{cell,eoc}$ value and a predefined cell end of discharge voltage $V_{cell,eod}$ value, and the positive electrode has an end of discharge voltage $V_{pos,eod}$ and the negative electrode has an end of discharge voltage $V_{neg,eod}$ when the secondary battery is at the predefined $V_{cell,eod}$, the value of $V_{pos,eod}$ corresponds to a voltage at which a state of charge of the positive electrode is at least 95% of its coulombic capacity and $V_{neg,eod}$ is at least 0.4 V (vs Li) but less than 0.9 V (vs Li), wherein the method comprises cycling the secondary battery by repeatedly charging the secondary battery to the charged state having a cell end of charge voltage that does not exceed the predefined $V_{cell,eoc}$ value, and discharging the secondary battery to the discharged state having a cell end of discharge voltage that does not exceed the predefined $V_{cell,eod}$ value.

2. The method of claim 1, wherein the value of $V_{pos,eod}$ corresponds to a voltage at which the state of charge of the positive electrode is at least 96% of its coulombic capacity and $V_{neg,eod}$ is at least 0.4 V (vs Li) but less than 0.9 V (vs Li).

3. The method of claim 1, wherein the value of $V_{pos,eod}$ corresponds to a voltage at which the state of charge of the positive electrode is at least 97% of its coulombic capacity and $V_{neg,eod}$ is at least 0.4 V (vs Li) but less than 0.9 V (vs Li).

4. The method of claim 1, wherein the value of $V_{pos,eod}$ corresponds to a voltage at which the state of charge of the positive electrode is at least 98% of its coulombic capacity and $V_{neg,eod}$ is at least 0.4 V (vs Li) but less than 0.9 V (vs Li).

5. The method of claim 1, wherein the value of $V_{pos,eod}$ corresponds to a voltage at which the state of charge of the positive electrode is at least 99% of its coulombic capacity and $V_{neg,eod}$ is at least 0.4 V (vs Li) but less than 0.9 V (vs Li).

6. The method of claim 1, wherein $V_{neg,eod}$ is at least 0.4 V (vs Li) but less than 0.8 V (vs Li).

7. The method of claim 1, wherein $V_{neg,eod}$ is at least 0.5 V (vs Li) but less than 0.8 V (vs Li).

8. The method of claim 1, wherein $V_{neg,eod}$ is at least 0.4 V (vs Li) but less than 0.7 V (vs Li).

9. The method of claim 1, wherein $V_{neg,eod}$ is at least 0.5 V (vs Li) but less than 0.7 V (vs Li).

10. The method of claim 1, wherein the carrier ions are lithium, sodium, potassium, magnesium or aluminum ions.

11. The method of claim 1, wherein the carrier ions are lithium, magnesium or aluminum ions.

12. The method of claim 1, wherein the carrier ions are lithium ions.

13. The method of claim 1, wherein the carrier ions are magnesium ions.

14. The method of claim 1, wherein the negative electrode comprises a microstructured silicon-containing active material that contains a significant void volume fraction to accommodate volume expansion and contraction as carrier ions are incorporated into or leave the negative electrode during charging and discharging cycles.

15. The method of claim 14, wherein the void volume fraction of the microstructured silicon-containing active material is at least 0.1.

16. The method of claim 14, wherein the void volume fraction of the microstructured silicon-containing active material is not greater than 0.8.

17. The method of claim 14, wherein the void volume fraction of the microstructured silicon-containing active material is about 0.15 to about 0.75.

18. The method of claim 14, wherein the void volume fraction of the microstructured silicon-containing active material is about 0.2 to about 0.7.

19. The method of claim 14, wherein the void volume fraction of the microstructured silicon-containing active material is about 0.25 to about 0.6.

20. The method of claim 14, wherein the microstructured silicon-containing active material comprises macroporous, microporous or mesoporous material layers or a combination thereof.

* * * * *